US012686201B2

(12) United States Patent
Spencer et al.

(10) Patent No.: US 12,686,201 B2
(45) Date of Patent: Jul. 21, 2026

(54) INSULATED COMPOSITE BOARDS

(71) Applicant: Continuus Materials Intellectual Property, LLC, The Woodlands, TX (US)

(72) Inventors: Matthew Spencer, Palatine, IL (US); Mya Fisher, Des Moines, IA (US); Sam DenHartog, Des Moines, IA (US); Brady Samuelson, Des Moines, IA (US)

(73) Assignee: Continuus Materials Intellectual Property, LLC, The Woodlands, TX (US)

( * ) Notice: Subject to any disclaimer, the term of this patent is extended or adjusted under 35 U.S.C. 154(b) by 217 days.

(21) Appl. No.: 18/532,005

(22) Filed: Dec. 7, 2023

(65) Prior Publication Data

US 2025/0187321 A1     Jun. 12, 2025

(51) Int. Cl.

| | |
|---|---|
| B32B 29/00 | (2006.01) |
| B32B 5/02 | (2006.01) |
| B32B 5/18 | (2006.01) |
| B32B 7/12 | (2006.01) |
| B32B 29/02 | (2006.01) |
| B32B 37/06 | (2006.01) |
| B32B 37/10 | (2006.01) |
| B32B 37/15 | (2006.01) |
| E04D 11/02 | (2006.01) |

(52) U.S. Cl.
CPC ............ *B32B 29/007* (2013.01); *B32B 5/022* (2013.01); *B32B 5/18* (2013.01); *B32B 7/12* (2013.01); *B32B 29/02* (2013.01); *B32B 37/06* (2013.01); *B32B 37/10* (2013.01); *B32B 37/15* (2013.01); *E04D 11/02* (2013.01); *B32B 2262/101* (2013.01); *B32B 2266/0214* (2013.01); *B32B 2305/022* (2013.01); *B32B 2307/304* (2013.01); *B32B 2317/12* (2013.01); *B32B 2419/06* (2013.01)

(58) Field of Classification Search
None
See application file for complete search history.

(56) References Cited

U.S. PATENT DOCUMENTS

| | | | |
|---|---|---|---|
| 6,233,896 B1 | 5/2001 | Coup | |
| 2010/0266833 A1 | 10/2010 | Day et al. | |
| 2010/0282632 A1* | 11/2010 | Schabel, Jr. .......... | E04B 1/7604 |
| | | | 428/407 |
| 2011/0091713 A1 | 4/2011 | Miller et al. | |
| 2014/0227928 A1 | 8/2014 | Ehbing et al. | |
| 2018/0283014 A1 | 10/2018 | Hodgkins et al. | |
| 2021/0238855 A1 | 8/2021 | Rayman et al. | |
| 2023/0234323 A1 | 7/2023 | Hubbard et al. | |

OTHER PUBLICATIONS

International Search Report and Written Opinion of Application No. PCT/US2024/058507, dated Apr. 3, 2025 (20 pages).

* cited by examiner

*Primary Examiner* — Arti Singh-Pandey
(74) *Attorney, Agent, or Firm* — Foley & Lardner LLP

(57) ABSTRACT

An insulated composite board includes a first composite board including a first layer including a plurality of cellulosic fragments and a plurality of plastic fragments and an insulation layer including a first face coupled to the first composite board, the insulation layer comprising a foam material.

12 Claims, 14 Drawing Sheets

10

18

16

14

12

Roof Membrane

Cover Board

Insulation

10

18

16

14

12

100

102
103
106
105
104

INSULATED COMPOSITE BOARDS

BACKGROUND

Effective and environmentally sound waste disposal is a common dilemma faced by most industrialized and developing nations. In recent history, waste has primarily been disposed of in landfills, which require substantial tracts of land that might otherwise be used for other meaningful purposes. Regulatory and political bodies, as well as generators of waste, are increasingly interested in reducing waste volumes, diverting waste from landfills and incinerators while promoting more sustainable usage of waste products. Unfortunately, despite efforts of governments and communities to institute and promote waste recycling programs, there remains a tremendous amount of recyclable material that is not recycled.

There is a critical need to utilize this vast resource of waste material and at the same time save the land now occupied as landfill space. It is therefore desirable to develop technologies that not only reduce the amount of waste destined for a landfill or incinerator, but also to capture and use such material for beneficial purposes.

Figure 1:
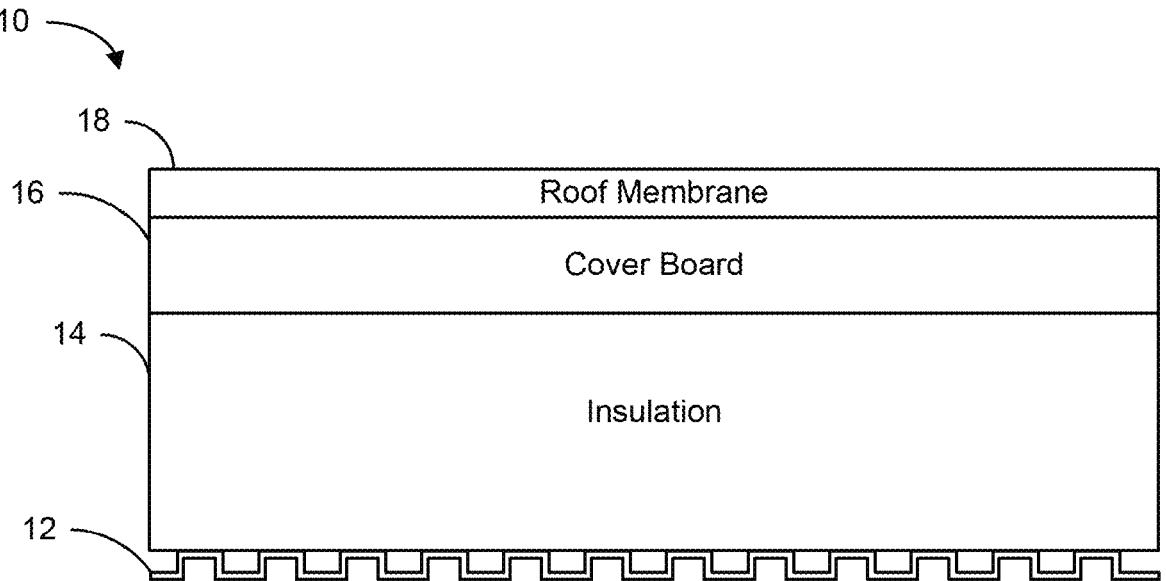
FIG. 1 is a side cross-section view of an example of a flat roof.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

FIG. 1 shows a cross-section of a portion of a flat roof 10 or low slope roof typically used in buildings such as commercial buildings. The flat roof 10 includes a deck structure, which may be made of corrugated sheet metal (e.g., steel), wood sheathing, or cement pads. At least one layer of insulation 14 is positioned on top of the deck 12. The most common material used as flat roof insulation is polyisocyanurate foam ("polyiso"). The insulation 14 thermally insulates the inside of the building from the outside environment. The resistance to heat transfer through a material is typically expressed as an R-value per inch, with higher R-values indicating better thermal insulation. The R-value of polyiso is about 6.8 per inch (R-6.8), which is among the highest among commercial insulating materials. Building codes typically require a specific R-value for insulating a roof. For example, a building code may require an R-value of R-30 for a commercial roof. Using polyiso at an R-value of 6.8 per inch, the polyiso layer or layers should be at least about 4.5 inches thick to achieve an R-value of R-30. In some cases, each polyiso board may be covered on each side by an outer facer layer, which may be a thin metal foil. In other embodiments, "plain" polyiso boards without outer facer layers may be used. Polyiso has a density of 24-44 kg/m³ and is relatively structurally weak. A coverboard 16 is positioned on top of the insulation 14 and a roof membrane 18 is positioned on top of the cover board. The cover board provides impact protection and distributes weight to allow for foot traffic on the roof 10 without damaging the insulation 14. Damage to the insulation, for example, if the cover board 16 were not present, can result in the loss of insulating properties, impressions in the roof resulting in water ponding, and damage to the roof membrane 18. The roof membrane 18 may be made from or may include polyvinyl chloride (PVC), ethylene propylene diene terpolymer (EPDM), or thermoplastic polyolefin (TPO). The roof membrane 18 may provide waterproofing and may prevent water pooling on low slope roofs.

Current solutions to reducing the amount of waste stored in landfills or burned in incinerators often involve converting the waste into a useful product. For instance, in one example, the waste may be captured, melted, and congealed into a composite board comprising a mixture of the captured waste. If the composite board is properly melted and congealed, the composite board may be capable of being exposed to outdoor elements (e.g., sun, rain, snow, sleet, temperature changes, heat, cold, etc.) for prolonged time periods without any substantial deformations. Construction companies may use such composite boards to build roofing and/or side paneling for houses or large buildings. Thus, instead of taking up space in landfills that are increasingly overflowing, waste may be manipulated by manufacturers into a composite board that can benefit many different types of consumers (e.g., homeowners, companies working in offices, warehouse owners, etc.). A composite board may be used to provide improved impact performance, improved water resistance, and reduced labor costs for flat and low-slope roofs compared to the conventional flat roof 10 discussed above. For example, a composite board may be used to replace the cover board 16 and/or the roof membrane 18 discussed above with respect to the flat roof 10.

One sample process for manufacturing composite boards is described in U.S. patent application Ser. No. 17/069,567, filed Oct. 13, 2020, the entirety of which is incorporated by reference herein. This process generally involves forming a mat comprised of fragments. In some cases, the fragments may be a mixture of discrete paper fragments (e.g., cellulosic fragments) and/or plastic fragments (e.g., thermoplastic polymer fragments). In other cases, each fragment may be comprised of separate layers of paper and thermoplastic polymer. The mat may include paper/plastic fragments sandwiched between top and bottom layers (e.g., facer layers). These top and bottom layers may include paper, fiberglass, films, and/or other nonwovens or facer fabrics. Thermoplastic adhesive layers may be positioned between the paper/plastic fragment-based core and the top and bottom surface layers. The mat may be assembled in a relatively cold state and the spatial order of the components may be mostly preserved throughout the subsequent thermal processing steps. The moisture content of the mat can range from about 0 percent to about 25 percent, or between about 1 percent and 20 percent. The mat is first subjected to a hot-pressing step under conditions that compress the mat and melt a significant portion of the thermoplastic polymer, especially fragments made of polyethylene. In a subsequent step, the hot mat may be subjected to a cold-pressing step under conditions that simultaneously maintain the compressed state of the mat and congeal (e.g., freeze) the molten thermoplastic in the mat. In some systems, a mat of paper and plastic may be continuously deposited onto a moving conveyor belt and moved through a continuous hot press. The hot press may include continuous heated belts, usually made of steel, above and below the mat that are heated to temperatures as high as 250 degrees Celsius. The continuous steel belts may move at approximately the same speed as a conveyor belt such that the mat of paper and plastic is continuously fed into and pressed by the heated belts. In other systems, a mat may be pressed between hot platens in a stationary press to melt the thermoplastic polymer, then pressed between cold platens in a stationary press to congeal the thermoplastic polymer.

Thermoplastic materials that may be used to form a composite board or other product may include polyethylene, polypropylene, copolymers of ethylene and propylene, thermoplastic polyolefin (TPO), polystyrene, and PVC including PVC-U, flexible PVC, and PVC-C. Thermoplastic materials with melt-point values (e.g., melting temperatures) in the range of about 90 degrees Celsius to about 165 degrees Celsius may be preferred. Thermoplastic polymers with melt-point values in the lower portion of this range may allow for products such as composite boards to be manufactured more quickly and using less energy, as the corresponding temperature of the hot presses may be lower.

Figure 2:
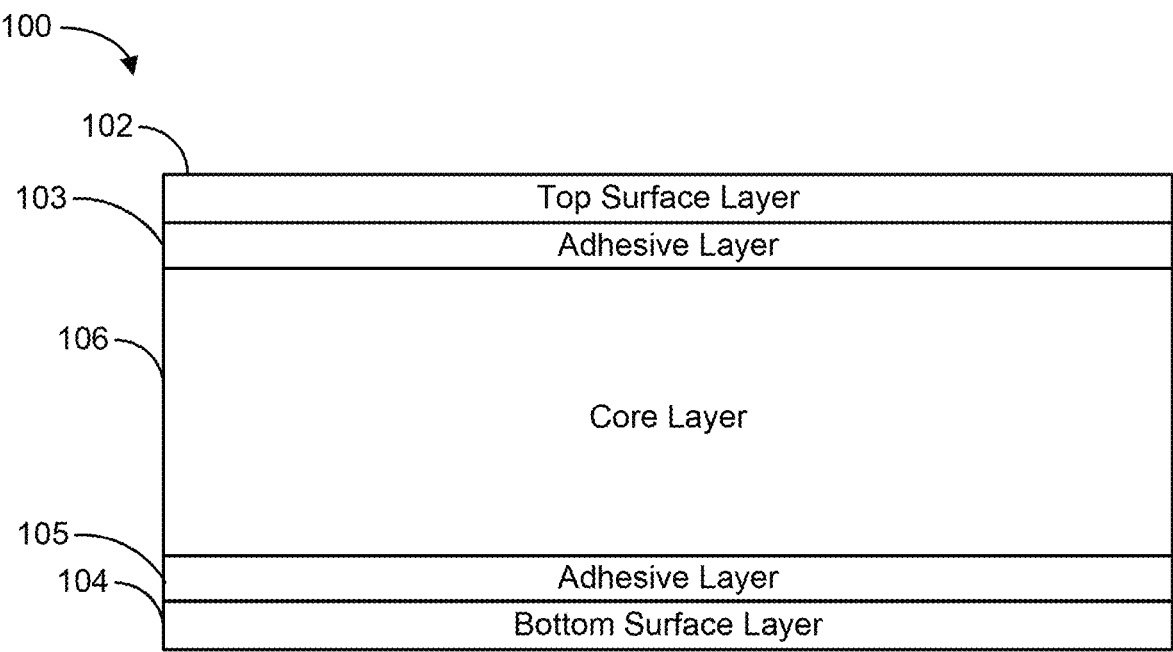
FIG. 2 is a side cross-section view of an example composite board, in accordance with some embodiments of the present disclosure.

Referring now to FIG. 2, an example composite board 100 is shown, in accordance with some embodiments of the present disclosure. Composite board 100 may be manufactured to operate as a roof cover board (e.g., similar to the cover board 16 of the flat roof 10 discussed above) and can provide impact protection (from hail, foot traffic, and/or heavy equipment), temporary water resistance, fire resistance, wind-uplift constraint, thermal dimensional stability, and/or flexibility that is often required in roofing applications. Composite board 100 may be manufactured such that mechanical fasteners can be used to couple composite board

100 to other components (e.g., a wood frame) and/or such that adhesives can be used to adhere other components to the outer surfaces of composite board 100.

The composite board 100 may comprise multiple discrete layers. For example, the composite board 100 shown in FIG. 2 includes a top surface layer 102, a bottom surface layer 104, and a core layer 106. The top surface layer 102 and bottom surface layer 104 may be made from glass fiber fabrics, including nonwoven fiberglass mat. The top surface layer 102 and bottom surface layer 104 may also comprise paper, including kraft paper and synthetic polymer films or nonwovens, especially those having a melt-point greater than about 300 degrees Fahrenheit, such as nylon, polyester, and certain polyether-based films or nonwovens. In some embodiments, the top surface layer 102 and the bottom surface layer 104 may each be about 0.002-0.100 inches thick.

Core layer 106 may be about 0.100-1.500 inches thick and may comprise discrete cellulosic elements and plastic elements. In some embodiments, the cellulosic elements and plastic elements may be connected through the use of a thermoplastic bonding resin, such as polyethylene. The cellulosic and plastic elements may be in the form of small pieces called fragments. The plastic elements may include a mixture of thermoset plastics, which do not melt, and thermoplastics. Thermoplastic elements (e.g., fragments) can include polyethylene, polypropylene, copolymers of ethylene and propylene, polystyrene, acrylonitrile, styrene butadiene resins, and PVC, including flexible PVC (e.g., plasticized PVC) and PVC-C. The size and shape of the plastic elements can vary substantially. Core layer 106 may be manufactured by heating and cooling a mat of discrete paper fragments and plastic fragments while applying pressure to the mat. The heat may melt the thermoplastic fragments, which then resolidify upon cooling.

Plastic fragments may be comprised of polypropylene, polystyrene, polyester, nylon, rubber (natural and synthetic), PVC (including flexible PVC and PVC-C), polyethylene (including LLDPE, LDPE, MDPE, HDPE), copolymers of ethylene and propylene, thermoplastic olefin (TPO), and other commercial plastics. Polyethylene based plastics, especially low and medium density polyethylene resins, may be used. The plastic fragments may be a mixture of different types of polymers. In addition to polymers, the core layer 106 can also contain plasticizers, such as dioctyl phthalate or benzyl butyl phthalate, colorants, stabilizers, preservatives, and other functional additives. Plastic fragments may be produced by disintegration (e.g., processing, shredding, milling, granulating, flaking, etc.) of larger pieces of plastic. The plastic may be recycled or sourced from waste streams (films, packaging, or a wide array of plastic articles). Generating plastic fragments from waste or recycling streams has the advantage of being low cost and helps to sustainably reduce waste, which is a worldwide problem.

The core layer 106 may also include cellulosic elements. Cellulosic elements can include wood, cotton, grass (including bamboo), pulp fibers derived from various plants, rayon fibers, cellulose esters and other derivatives, paper, and other cellulose-based materials. Cellulosic elements may include paper fragments. Paper fragments may be made by milling larger pieces of paper until the disintegrated material passes through a screen with a particular mesh size. Paper subjected to the disintegration process may be newspaper, advertising, office paper, packaging, or other paper products. The paper may be recycled or sourced from waste streams. Generating paper fragments from waste or recycling streams has the advantage of being low cost and helps to sustainably reduce waste, which is a worldwide problem. In some embodiments, individual fragments could contain both paper and plastic. For example, many packaging materials found in waste streams are comprised of a plurality of alternating paper and plastic layers. In some cases, these packaging materials may also include a layer of aluminum foil or a film that has been metalized on one surface. Fragments derived from all these materials may be suitable for embodiments of this disclosure.

In the embodiment shown in FIG. 2, the composite board 100 includes a lower adhesive layer 105 between the bottom surface layer 104 and the core layer 106 and an upper adhesive layer 103 between the top surface layer 102 and the core layer 106. The adhesive layers 103, 105 may be or may include a thermoplastic adhesive such as low-density polyethylene (LDPE) or polypropylene. The thermoplastic adhesive may bond the surface layers 102, 104 to the core layer 106 when the board is heated and cooled. In some embodiments, the core layer 106 may include multiple layers of discrete paper fragments and plastic fragments. The thermoplastic adhesive may be or may include TPO and/or PVC, which may be new flexible PVC or recycled flexible PVC. The adhesive layers 103, 105 may include, for example, fragments of TPO and/or flexible PVC. In some embodiments, the plastic fragments in the second layer may include fragments of TPO and/or flexible PVC. In some embodiments, paper and/or plastic fragments in the adhesive layers 103, 105 may be coated in TPO and/or flexible PVC.

The structure of composite board 100 may be designed to achieve compression load support, sudden impact resistance, wind uplift resistance, fastener retention, adhesive compatibility, temporary rain protection, low flame spread, thermal dimensional stability, and an exceptional level of mechanical flexibility. The design promotes rapid and easy installation of the cover board in a commercial low slope roof application. It may be especially advantageous in re-roofing applications due to its level of flexibility, which may allow it to more easily conform to the curved contour of the perimeter region of the roof. The upper (when installed) outer surface of the board may allow for the absorption of adhesives but may temporarily resist transfer of rainwater into the core layer of the board. It should be understood that while the examples described herein relate to the manufacture of composite boards, other goods may be manufactured using similar processes. These products may include drywall, wallboard, construction sheeting, exterior or interior sheathing, paper, cardboard, signage, boxes, shipping containers, etc.

Figure 3:
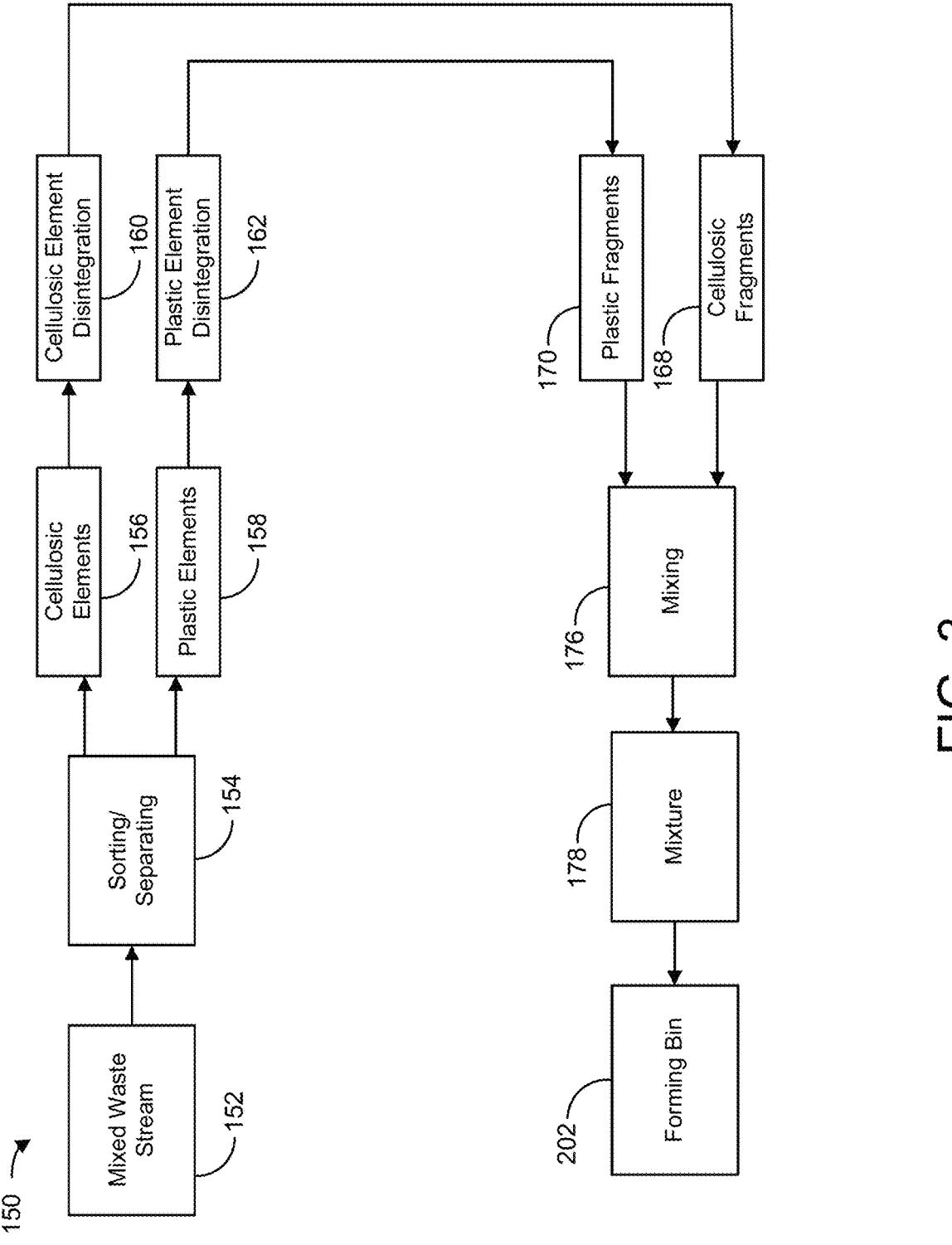
FIG. 3 is a flow diagram of an example process for preparing materials for use in forming a composite mat, in accordance with some embodiments of the present disclosure.

Referring now to FIG. 3, a schematic diagram depicting a portion of insulated composite board manufacturing system 150 for preparing materials for use in forming a composite mat is shown, according to some embodiments. A waste stream 152 including cellulosic and/or plastic materials is sorted and separated into a set of cellulosic elements 156 and plastic elements 158 by a sorting and separating assembly 154. The waste stream 152 may be a mixed municipal waste stream, an industrial waste stream, or any other collection of materials including cellulosic and/or plastic materials. The sorting and separating assembly 154 may be or may include a magnet for removing ferromagnetic materials, a preliminary shredding/disintegration assembly, and an air classifier for sorting the waste stream 152. The sorting and separating assembly 154 may remove cellulosic elements 156 and plastic elements 158 from the waste stream 152. In some embodiments, the cellulosic elements 156 and plastic elements 158 may also be separated from each other. In other embodiments, the cellulosic elements

156 and plastic elements 158 may be separated from other materials, such as metal and glass, but may remain mixed together. The cellulosic elements 156 may include wood, cotton, grass (including bamboo), pulp fibers derived from various plants, rayon fibers, cellulose esters and other derivatives, paper, and other cellulose-based materials. The size and shape of the cellulosic elements 156 can vary substantially.

The plastic elements 158 may include PVC, including flexible PVC and PVC-C, as well as thermoplastic elements other than PVC. The plastic elements 158 may be comprised of the same specific material or of a variety of materials including thermoplastic materials with different melt points. The plastic elements 158 may include polyethylene (including LLDPE, LDPE, MDPE, HDPE), polypropylene, copolymers of ethylene and propylene, polystyrene, acrylonitrile, polyester, nylon, rubber (natural and synthetic), TPO, and styrene butadiene resins. The size and shape of the plastic elements 158 can vary substantially. The plastic elements 158 may also include mixtures of thermoset plastics, which generally do not melt, as well as thermoplastic materials with melting temperatures that exceed the processing temperatures used to form the composite boards or other products. In some embodiments, the cellulosic elements 156 and/or plastic elements 158 may be presorted. For example, the waste stream 152 may include a collection of cellulosic elements 156 and/or a collection of plastic elements 158 or a mixed collection of cellulosic elements 156 and plastic elements 158.

After the sorting and separating operations, the cellulosic elements 156 and plastic elements 158 may be disintegrated in disintegration assemblies 160, 162 to form cellulosic fragments 168, such as paper fragments, and plastic fragments 170. The cellulosic disintegration assembly 160 may be or may include a shredder, granulator, mill, flaker, grinders, or other machine and may be configured to mill cellulosic elements 156 (e.g., large pieces of paper) until the disintegrated material passes through a screen with a particular mesh size. Paper subjected to the milling process can be newspaper, advertising paper, office paper, packaging, or other paper products. In some embodiments, the cellulosic elements 156 that are disintegrated into cellulosic fragments 168 may be new material. In other embodiments, the cellulosic elements 156 may be recycled or sourced from waste streams (e.g., waste stream 152). Generating cellulosic fragments 168, including paper fragments, from waste or recycling streams may be low-cost and improves sustainability by recovering and reusing material that may otherwise be incinerated or sent to a landfill. In some embodiments, the cellulosic fragments 168 may have a thickness and diameter of less than about 0.02 inches.

The plastic disintegration assembly 162 may be or may include a shredder, granulator, mill, flaker, grinder, or other machine and may be configured to mill larger plastic elements 158 into plastic fragments 170. The plastic elements 158 may be milled until the disintegrated material passes through a screen with a particular mesh size. The plastic fragments 170 may be a mixture of different types of polymers as well as plasticizers, such as dioctyl phthalate, benzylbutylphthalate, dibutylphthalate, diisononylphthalate, and diisodecylphthalate. The plastic fragments 170 may also contain colorants, stabilizers, preservatives, and other functional additives. In some embodiments, the plastic elements 158 that are disintegrated into the plastic elements 158 may be new material. In other embodiments, the plastic elements 158 may be recycled or sourced from waste streams (e.g., waste stream 152). Generating plastic fragments 170, from waste or recycling streams may be low-cost and improves sustainability by recovering and reusing material that may otherwise be incinerated or sent to a landfill. In some embodiments, the plastic fragments 170 may have a thickness and diameter of less than about 0.02 inches. After the disintegration operations, the cellulosic fragments 168 and plastic fragments 170, may be combined in a mixing assembly 176 to form a mixture 178. In some embodiments, the disintegration assemblies 160, 162 may be combined. For example, the plastic elements 158 and cellulosic elements 156 may be mixed together and then disintegrated in a single combined disintegration assembly. After the fragments 168, 170 are mixed in the mixing assembly 176, the mixture 178 may be provided to a forming bin 202 and used to form a layer of fragments that can be heated and pressed to form the core layer 106 of the composite board 100. In other embodiments, the mixture 178 may be provided to a manufacturing system for other products.

In some embodiments, similar operations are performed to create different mixtures 178. For example, the core layer 106 of the composite board 100 may include multiple layers. The portion of insulated composite board manufacturing system 150 may be controlled to form mixtures 178 with fragments of different sizes and different ratios of cellulosic material and plastic material. The different mixtures 178 may be deposited in different forming bins 202 and used to form different layers within the core layer 106 and/or the adhesive layers 103, 105. In other embodiments, multiple portions of the system 150 as shown in FIG. 3 may be used to create the different mixtures 178 in parallel.

In some embodiments, individual cellulosic and plastic elements 156, 158 and fragments 168, 170 may contain both paper and plastic. For example, many packaging materials found in waste streams (e.g., waste stream 152) are made of a plurality of alternating paper and plastic layers. In some cases, these packaging materials can also include a layer of aluminum foil or a film that has been metalized on one surface. These fragments may be included in the mat of materials heated, pressed, and cooled to form the core layer 106 of a composite board 100.

Figure 4:
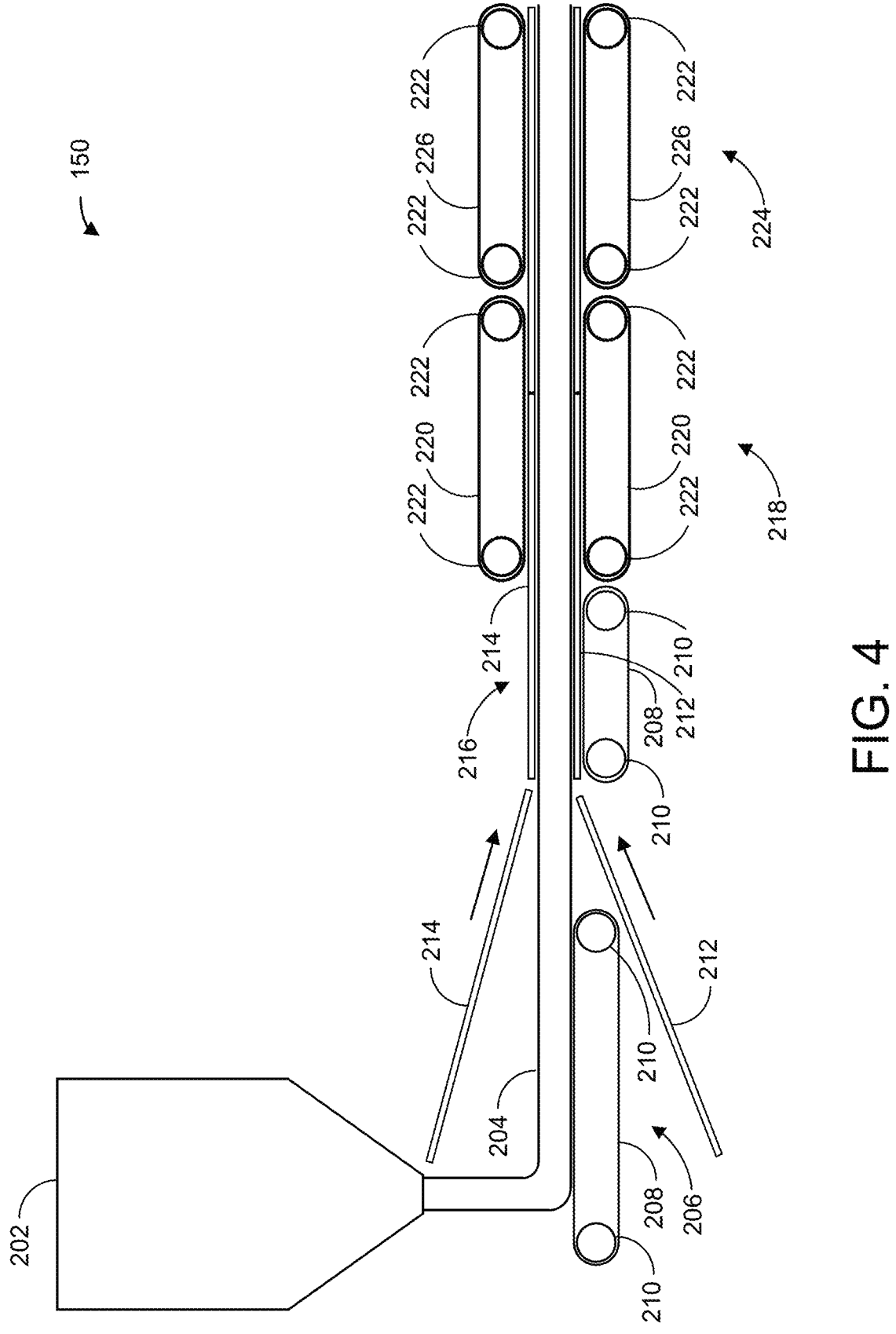
FIG. 4 is a side view illustration of a portion of an insulated composite board manufacturing system, in accordance with some embodiments of the present disclosure.

Referring now to FIG. 4, another portion of the insulated composite board manufacturing system 150 is shown in further detail, in accordance with some embodiments of the present disclosure. It should be understood that the various components of the insulated composite board manufacturing system 150 shown in FIG. 4 are not to scale. Further, certain components in the system, including cutting components, are not shown. As discussed above, the insulated composite board manufacturing system 150 may include a forming bin 202 configured to receive the mixture 178 from the mixing assembly 176 and to dispense a continuous mat 204 of plastic and cellulosic fragments onto a conveyor system 206. In some embodiments, multiple forming bins 202 may be arranged to dispense different mixtures to form a continuous mat 204 with multiple layers of fragments. The continuous mat 204 may be heated, pressed, and cut to form the core layer 106 of the composite board 100. In some embodiments, the continuous mat 204 may also include layers that form the adhesive layers 103, 105 of the composite board. The conveyor system 206 may include one or more belts 208 arranged end to end, each belt 208 traveling around two or more rollers 210. One or more of the rollers 210 may be driven, for example, by a motor or engine. The conveyor system 206 may move the continuous mat 204 through the various stages of manufacturing of the composite board 100. As used herein, the term "downstream" refers to the direction that the conveyor system 206 moves the continuous mat 204, and the term "upstream" refers to a direction opposite the direction that the conveyor system 206 moves the continuous mat 204. In some embodiments, a first mixture 178 may be supplied to two forming bins used to form outer layers of the continuous mat 204 and a second mixture may be supplied to a third forming bin 202 to form an inner layer of the continuous mat 204. The outer layers of the continuous mat 204 may form the adhesive layers 103, 105 of the composite board 100 or may become outer layers of a multilayer core layer 106. The inner layer of the continuous mat 204 may become the core layer 106 or an inner layer of a multilayer core layer 106. Additional forming bins 202 may be included to form additional layers. Each forming bin 202 may receive and dispense a different mixture, or, in some cases, some of the forming bins 202 may receive and dispense the same mixture.

Lower facers 212 may be inserted from underneath the conveyor system 206 such that the lower facers 212 are positioned between the continuous mat 204 and the conveyor belt 208. For example, automation devices may be used to handle and position the lower facers 212. In some embodiments, the lower facers 212 may be positioned on the conveyor system 206 upstream of the forming bin 202, such that the continuous mat 204 is deposited directly onto the lower facers 212. Upper facers 214 may be positioned on top of the continuous mat 204 to form a composite sandwich 216 including the continuous mat 204 sandwiched between the lower facers 212 and the upper facers 214. For example, automation devices may be used to handle and position the upper facers 214. Thus, when the continuous mat 204 is pressed, cooled, and cut, a lower facer 212, or a portion of a lower facer 212, may form the bottom surface layer 104 of the composite board 100. The upper facer 214, or a portion of the upper facer 214, may form the top surface layer 102 of the composite board. In some embodiments, only the upper facers 214 or only the lower facers 212 may be added, such that the finished composite board 100 does not include either a top surface layer 102 or a bottom surface layer 104. In some embodiments, neither the upper facer 214 or the lower facer 212 may be added, such that the finished composite board does not include a top surface layer or a bottom surface layer. In some embodiments, the mat of paper and plastic that is pressed to form the core layer 106 may not be continuous. For example, the core layer 106 material may be deposited onto the conveyor belt 208 with periodic interruptions if needed for manufacturability. The upper and lower facers 212, 214 may be made from paper, woven cellulosic fabrics, hydroentangled cellulosic nonwoven fabrics, nylon film, polyester film, nylon nonwoven fabrics, polyester nonwoven fabrics, nylon woven fabrics, polyester woven fabrics, glass fiber nonwoven fabrics, glass woven roving, metallic foils, and other thin sheet or roll goods. The upper and lower facers 212, 214 may have a melt point above 350 degrees Fahrenheit or above 450 degrees Fahrenheit, or may not have a recognized melt point. The facers 212, 214 may be made of intractable materials, where "intractable materials" means polymeric materials that are insoluble in water and have a melt-point greater than about 350 degrees Fahrenheit. The facers 212, 214 may each have a thickness between about 0.00001 inches and 0.20 inches in some embodiments, the thickness of the facers 212, 214 may exceed 0.20 inches. In some embodiments, an adhesive may be applied to the facers 212, 214 on the faces that contact the mat 204.

After the lower facers 212 and/or the upper facers 214 are positioned respectively underneath and/or on top of the continuous mat 204, the conveyor system 206 may move the composite sandwich 216 to a hot press assembly 218. The hot press assembly 218 may include heated belts 220, each traveling around two or more rollers 222 in a continuous circuit, positioned above and below the composite sandwich 216. One or more of the rollers 222 may be driven, for example, by a motor or engine. In some embodiments, the heated belts 220 may be made of steel. The heated belt 220 may be heated to a temperature in the range of about 350 degrees Fahrenheit to about 480 degrees Fahrenheit. A heating element (e.g., a resistive heating element, an inductive heating element, etc.) may be placed in contact with or in proximity to the heated belt 220 to heat the heated belt 220 to the desired temperature. For example, a resistive heating element may be positioned between the upper and lower segments of each heated belt 220 or adjacent the segment of the heated belt 220 not in contact with the composite sandwich 216. In some embodiments, one or more of the rollers 222 may include heating elements, and heat may be transferred from the rollers 222 to the heated belts 220. In some embodiments, hot platens can be positioned on the outside surfaces of the steel belt and can be used to heat the steel belt. These platens can also apply pressure to the mat through the steel belt. In some embodiments, small rolling pins are positioned between the platens and the steel belt to reduce the force required to slide the steel belt past the platens. The platens can be heated by circulating hot oil through conduits within the platens. The oil can be heated in a combustion system that utilizes natural gas or other fuels. The system 150 may include temperature sensors to measure the temperatures of the heated belts 220. Sensors can also be used to measure the temperature of the hot platens or other heating devices that might be used to heat the steel belt. The measurements can be used to control the heating elements or hot oil fluid flow to maintain the heated belts 220 at the desired temperature. The heated belts 220 and rollers 222 may function similarly to the conveyor system 206, with the rollers 222 being configured to drive the heated belts 220 to move the composite sandwich 216 continuously through the hot press assembly 218. At the same time, the heated belts 220 and platens apply heat and high pressure to melt the plastic in the continuous mat 204 and compress the composite sandwich 216. In some embodiments, there may be only one heated belt 220 either above or below the composite sandwich 216, with the other side of the composite sandwich 216 not being heated. In these embodiments, a non-heated belt (e.g., similar to conveyor belt 208) may be used to apply pressure, but not heat, to the opposite side of the composite sandwich 216. The speed and length of the heated belts 220 may determine the amount of time that the heated belts 220 apply heat and pressure to the composite sandwich 216. The amount of time that the heat and pressure are applied may be sufficient to melt at least some of the plastic fragments 268 in the mat 204.

As the composite sandwich 216 exits the hot press assembly 218, the heated belts 220 may move the composite sandwich 216 to a cold press assembly 224. In some embodiments, an additional section of the conveyor system 206 may move the composite sandwich 216 from the hot press assembly 218 to the cold press assembly 224. The cold press assembly 224 may include cold belts 226, each traveling around two or more rollers 222 in a continuous circuit, positioned above and below the composite sandwich 216. One or more of the rollers 222 may be driven, for example, by a motor or engine. In some embodiments, the cold belts 226 may be made of steel. In some embodiments, "cold belts" may refer to belts that are colder than the heated composite sandwich 216. In some embodiments, cold platens can be positioned on the outside surfaces of the steel belt and can be used to cool the steel belt. These platens can also apply pressure to the mat through the steel belt. In some embodiments, small rolling pins are positioned between the platens and the steel belt to reduce the force required to slide the steel belt past the platens. The platens can be cooled by circulating cold fluid through conduits within the platens. The cold fluid can be generated using a chiller or refrigeration unit. The cold fluid may be colder than a temperature of the heated composite sandwich 216. The system 150 may include temperature sensors to measure the temperatures of the cold belts 226. The measurements can be used to control a refrigeration system to maintain the cold belts 226 at a desired temperature. The cold belts 226 and rollers 222 may function similarly to the conveyor system 206, with the rollers 222 being configured to drive the cold belts 226 to move the composite sandwich 216 continuously through the cold press assembly 224. At the same time, the cold belts 226 and platens apply high pressure to resolidify (e.g., freeze, congeal, etc.) the plastic in the continuous mat 204 and compress the composite sandwich 216. In some embodiments, there may be only one cold belt 226 either above or below the composite sandwich 216, with the other side of the composite sandwich 216 not being cooled. In these embodiments, a non-cooled belt (e.g., similar to conveyor belt 208) may be used to apply pressure, but not remove heat, from the opposite side of the composite sandwich 216.

As discussed above, a stationary hot press comprising hot platens may replace the hot press assembly 218, and a stationary cold press with cold platens may replace the cold press assembly 224. For example, the forming bin 202 may deposit portions of the mixture 178 into a forming box to form a mat, similar to the continuous mat 204 described above. The mat may be moved in sequence to the stationary hot press, in which the hot platens compress the mat and melt the plastic, and then to the cold press, in which the cold platens compress the mat and congeal the plastic. Like the continuous mat 204, the mat formed in the forming box may be positioned between facer layers or may have a facer layer on either side thereof. The stationary hot press may be a single-opening press or a multi-opening press and may apply heat and pressure for an amount of time sufficient to melt at least some of the plastic fragments 268 in the mat. Cold platens of a cold press may apply pressure to the mat for an amount of time sufficient to congeal the melted plastic fragments. As discussed above, the components of the system 150 may be made from, coated with, or plated with corrosion-resistant materials. For example, the belts 220, 226 and rollers 222 of the hot and cold presses 218, 224, the hot platens of stationary presses, the ventilation system 230, the forming bin 202, etc. may be made from stainless steel, coated in PTFE, or plated in gold, platinum, or nickel.

Figure 5:
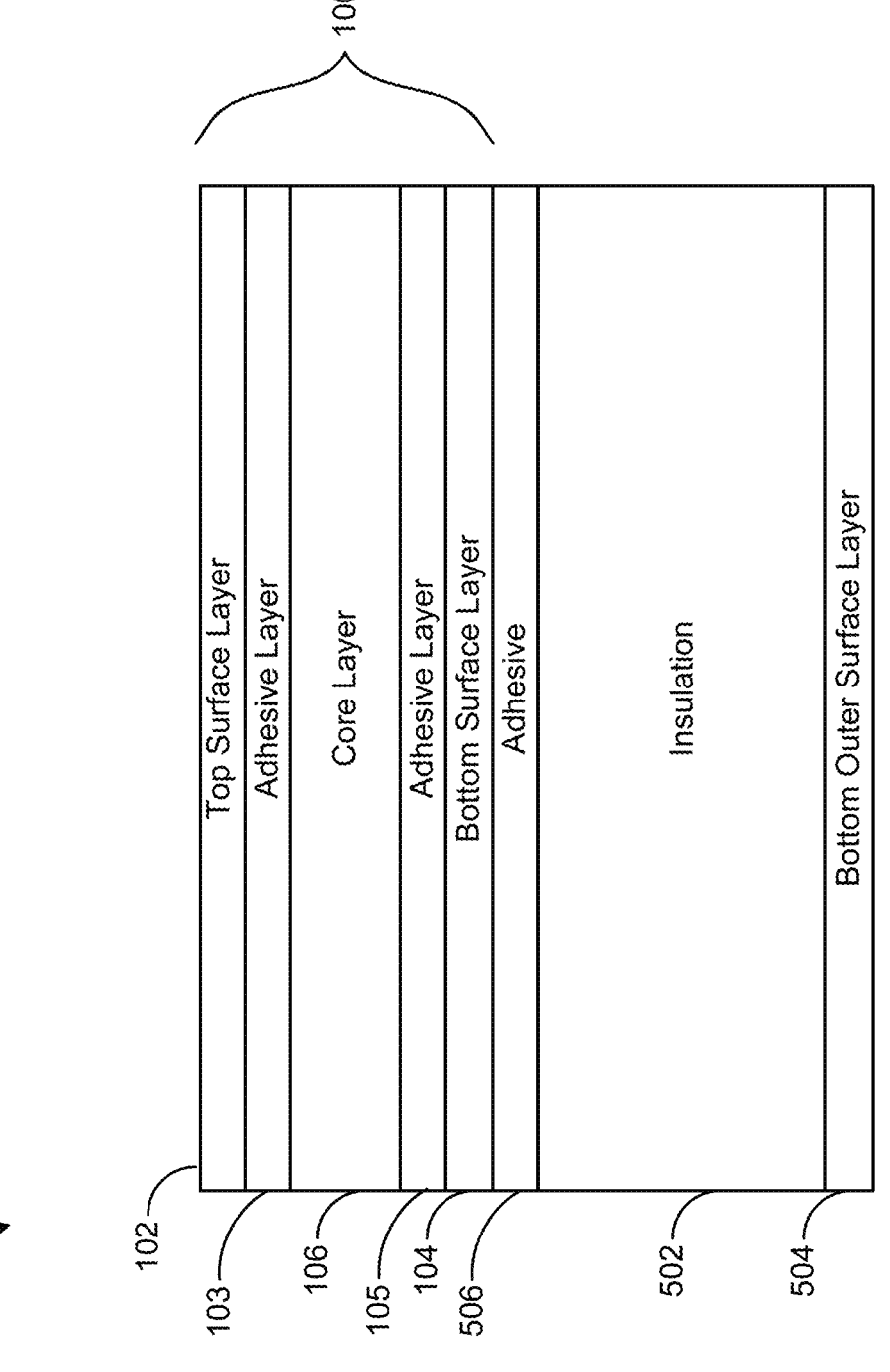
FIGS. 5-10 are a side cross-section views of example insulated composite boards, in accordance with some embodiments of the present disclosure.

As discussed above, the composite board 100 may be used in place of a cover board 16 and/or a roof membrane 18 in a flat roof 10. In some embodiments, an insulated composite board 500 may be formed incorporating a composite board 100 and an insulation layer. The insulated composite board 500 may be used in a flat or low slope roof in place of the insulation layer 14 in addition to the coverboard 16. FIGS. 5-10 show cross-sections of several embodiments of a portion of an insulated composite board 500 incorporating at least one composite board 100 bonded to an insulation layer 502. It should be understood that the insulated composite boards 500 are not to scale. For example, the composite boards 500 may be between about 0.10 inches thick and about 0.55 inches thick, or between about 0.05 inches thick to about 0.75 inches thick, and the insulation layer may be between about 0.50 inches thick and about 5.00 inches thick, or between about 0.25 inches thick and about 6 inches thick. Referring now to FIG. 5, an embodiment of the insulated composite board 500 is shown. The insulated composite board 500 includes a composite board 100 including a top surface layer 102, an upper adhesive layer 103, a core layer 106, a lower adhesive layer 105, and a bottom surface layer 104. The bottom surface layer 104 of the composite board 100 is bonded to an insulation layer 502 by a layer of adhesive 506. A bottom outer surface layer of 504 is bonded to the insulation layer 502. The insulation layer 502 may be made of polyiso, similar to the insulation layer 14 of the flat roof 10. The bottom outer surface layer 504 may be a thin metal foil layer as discussed above with respect to the insulation layer 14. The insulated composite board 500 may be incorporated into a roof or roof section similar to the flat roof 10. For example, the insulated composite board 500 may be positioned on top of a deck (e.g., the deck 12) such that the bottom outer surface layer of 504 is adjacent the deck, and the top surface layer 102 facing upward. A roof membrane (e.g., roof membrane 18) may be positioned on top of the top surface layer 102. In other embodiments, a roof membrane 108 may not be used, as the top surface layer 102 of the insulated composite board 500 may provide sufficient waterproofing.

Figure 6:
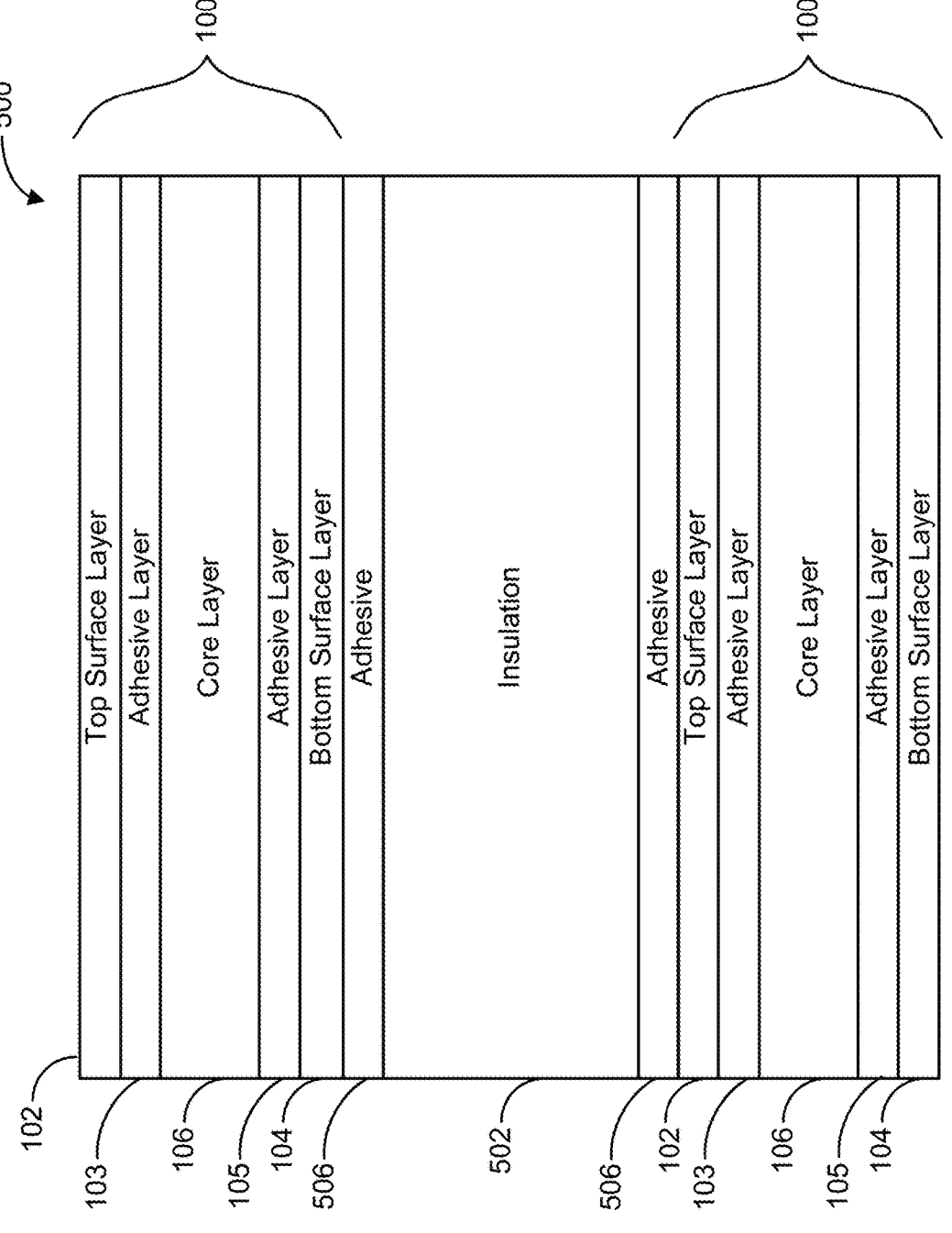

Referring now to FIG. 6, another embodiment of the insulated composite board 500 is shown. The insulated composite board 500 of FIG. 6 may be substantially similar to the insulated composite board 500 of FIG. 5, except as shown and described herein. Instead of the bottom outer surface layer 504 as described with reference to the insulated composite board 500 of FIG. 5, insulated composite board 500 of FIG. 6 includes a second composite board 100 bonded to the bottom of the insulation layer 502 by another layer of adhesive 506. Thus, the insulation layer 502 is sandwiched between two composite boards 100 coupled to each side of the insulation layer 502 by a layer of adhesive 506.

Figure 7:
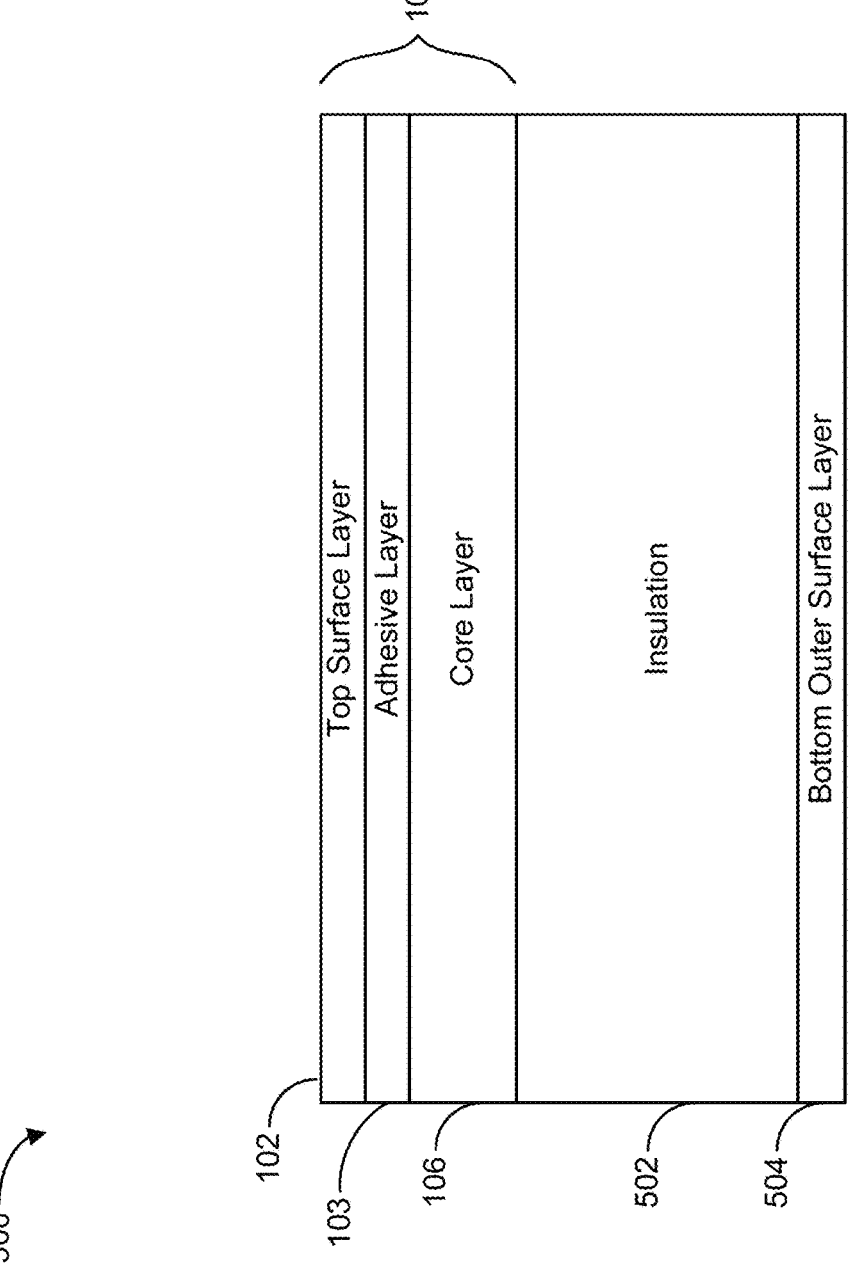

Referring now to FIG. 7, another embodiment of the insulated composite board 500 is shown. The insulated composite board 500 of FIG. 7 may be substantially similar to the insulated composite board 500 of FIG. 5, except as shown and described herein. The insulated composite board 500 of FIG. 7 includes a composite board 100 including a top surface layer 102, an upper adhesive layer 103, and a core layer 106. The composite board 100 does not include a lower adhesive layer 105 or a bottom surface layer 104. The insulated composite board 500 of FIG. 7 also does not include a separate adhesive layer 506 between the composite board 100 and the insulation layer 502. Similar to the insulated composite board 500 of FIG. 5, the insulated composite board 500 of FIG. 7 includes a bottom outer surface layer 504. The insulation layer 502 may be formed by pouring an uncured liquid foam onto the composite board 100. For example, the composite board 100 shown in FIG. 7 may be positioned "upside down" with the top surface layer 102 facing downward and the core layer 106 facing upward. The uncured liquid foam may be poured onto the core layer 106, where the liquid foam may be allowed to grow and cure on top of the core layer 106. The liquid foam may have adhesive properties causing the liquid foam to bond to the core layer 106 without an additional layer of adhesive. The composite board 100 and liquid foam may be placed into a frame to constrain the liquid foam to the footprint of the composite board 100 during the curing process.

Figure 8:
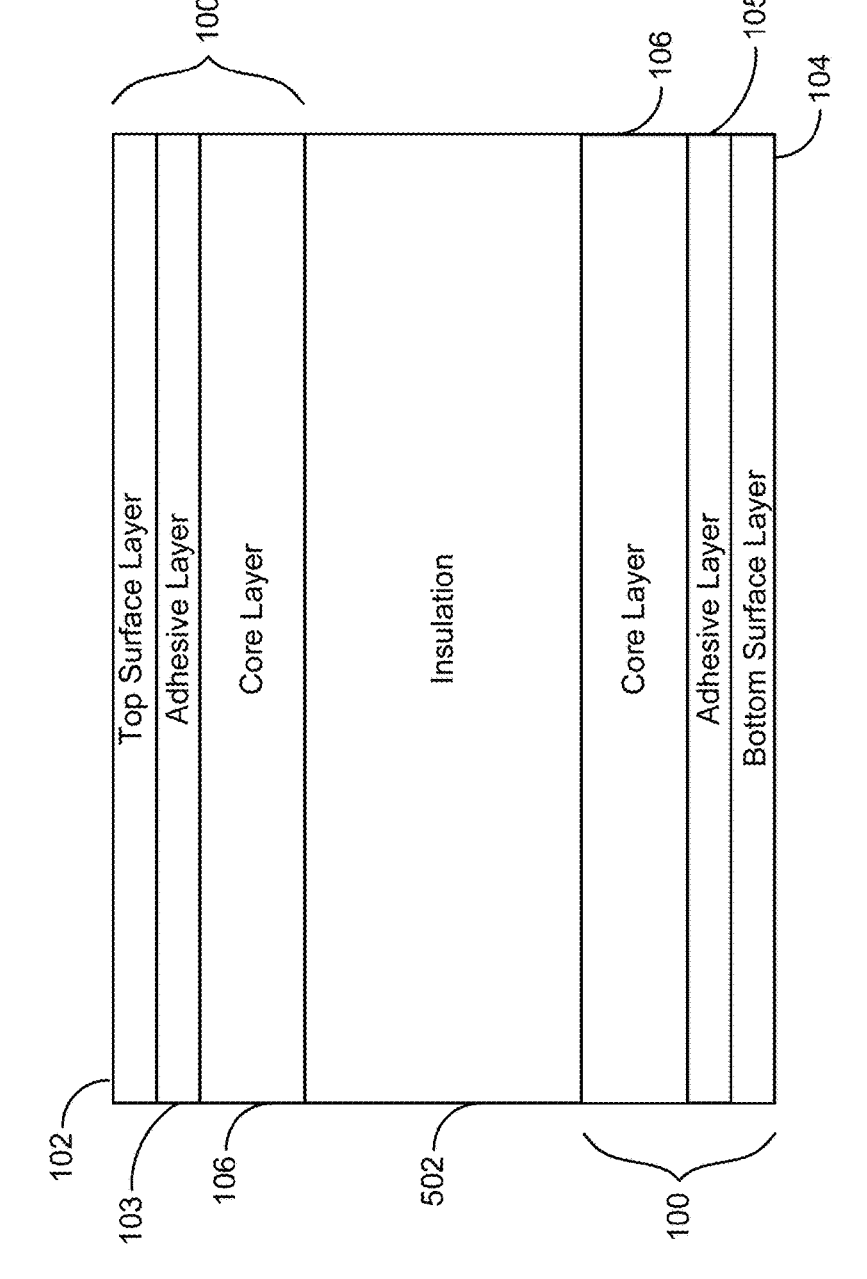

Referring now to FIG. 8, another embodiment of the insulated composite board 500 is shown. The insulated composite board 500 of FIG. 8 may be substantially similar to the insulated composite board 500 of FIG. 7, except as shown and described herein. Instead of the bottom outer surface layer 504 as described with reference to the insulated composite board 500 of FIG. 7, the insulated composite board 500 of FIG. 8 includes a second composite board 100 bonded to the bottom of the insulation layer 502. The second composite board includes a core layer 106, a lower adhesive layer 105, and a bottom surface layer 104 but does not include an upper adhesive layer 103 or top surface layer 102. Further, the insulated composite board 500 does not include a layer of adhesive between the composite board 100 and the insulation layer 502. Thus, the core layer 106 directly contacts the insulation layer 502. As discussed above with respect to claim FIG. 7, the insulation layer 502 may be formed from an uncured liquid foam poured over the composite board which adheres to the composite board 100 as the foam cures. To assemble the insulated composite board 500 of FIG. 8, the uncured liquid foam may be poured over the core layer 106 of the lower composite board 100, and the upper composite board 100 may be placed on the layer of liquid foam before the liquid foam cures. As the liquid foam cures and dries, the insulation layer 502 forms and bonds to the core layers 106 of each composite board.

Figure 9:
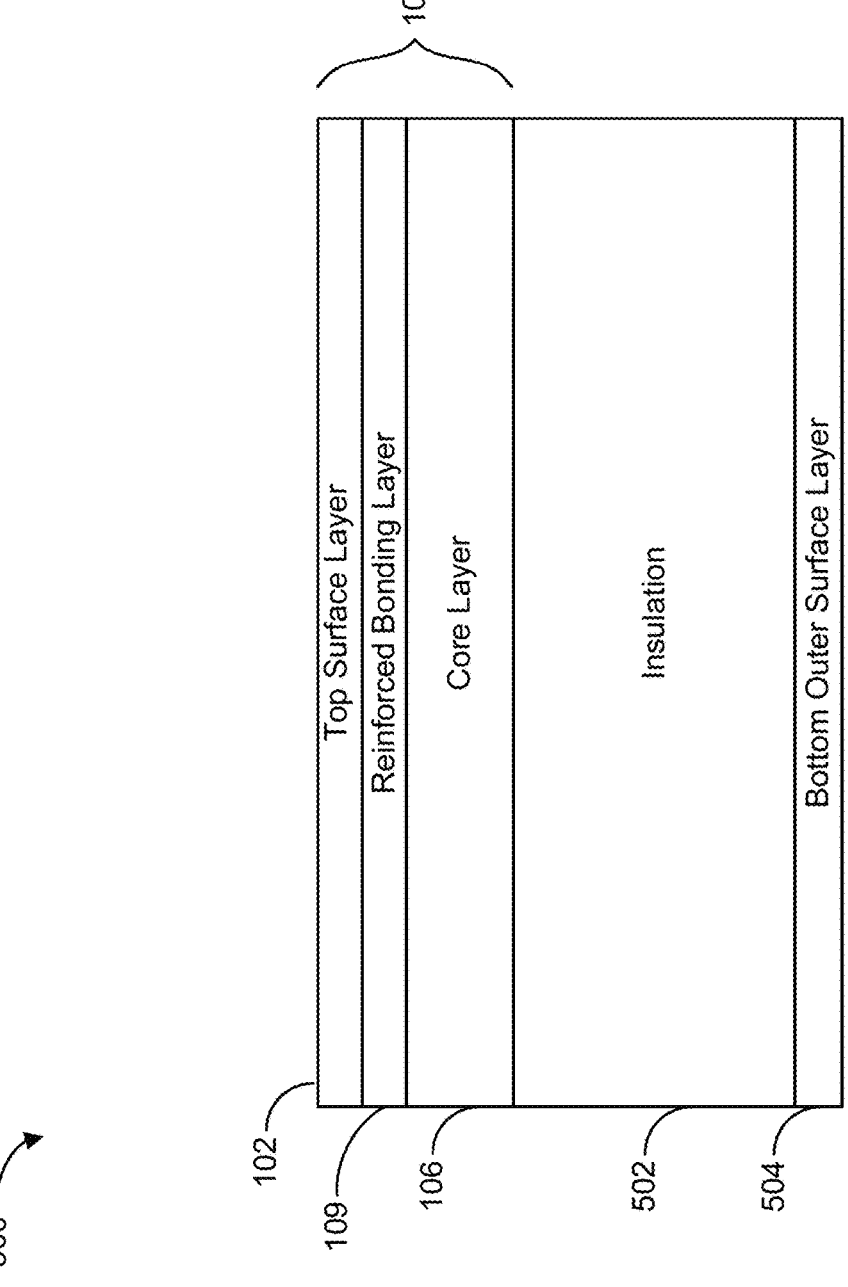

Referring now to FIG. 9, another embodiment of the insulated composite board 500 is shown. The insulated composite board 500 of FIG. 9 may be substantially similar to the insulated composite board 500 of FIG. 7, except as shown and described herein. Instead of the adhesive layer 103 described above, which may be a thermoplastic adhesive, the insulated composite board 500 of FIG. 9 as described with reference to the insulated composite board 500 of FIG. 7, the insulated composite board 500 of FIG. 8 includes a reinforced bonding layer 109. The reinforced bonding layer may include a thermoplastic material with glass or polyester filaments. For example, the reinforced bonding layer may be a layer of polypropylene with uninterrupted glass filaments or polyester filaments extending longitudinally through the polypropylene. In some embodiments, the polypropylene may be approximately 0.001 inches to 0.009 inches. In some embodiments, the filaments may be positioned approximately 0.31 inches to approximately 0.125 inches apart. The reinforced bonding layer 109 may provide additional protection to the insulation 502 to reduce the effects of impacts from objects such as hail with a diameter of 2 inches or larger.

Figure 10:
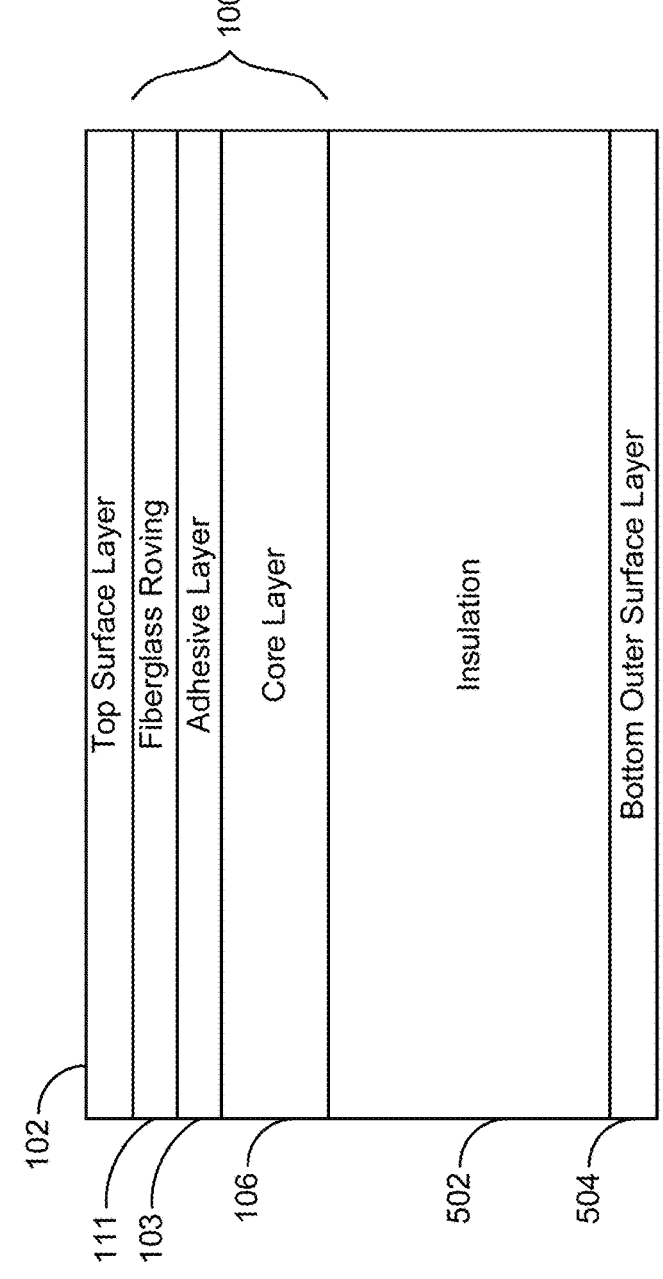

Referring now to FIG. 10, another embodiment of the insulated composite board 500 is shown. The insulated composite board 500 of FIG. 9 may be substantially similar to the insulated composite board 500 of FIG. 7, except as shown and described herein. In addition to the layers discussed above with respect to FIG. 7, the insulated composite board 500 of FIG. 9 includes a fiberglass roving layer 111 between the adhesive layer 103 and the top surface layer 102. The fiberglass roving layer 111 may be a roving (e.g., a cloth, fabric, woven sheet, etc.) made of fiberglass filaments. The fiberglass filaments may be continuous, untwisted filaments and may provide a roving layer 111 with a high fiber content resulting in increased impact resistance. The fiberglass roving layer 111 may be porous, such that the adhesive layer 103 extends through the fiberglass roving layer 111 and bonds to the top surface layer 102. The fiberglass roving layer 111 may have a basis weight between 0.016 pounds per square foot and 0.04 pounds per square foot. The fiberglass roving layer 111 can reduce the effects of impacts from objects such as hail with a diameter of 3 inches or larger.

In each embodiment of the insulated composite board 500, the thermal insulation properties of the insulated composite board were higher than those of a layer of polyiso having the same thickness as the insulation layer 502. Further, the insulated composite board 500 provides improved impact resistance, roof membrane puncture resistance, adhesion to the roof membrane, and fastener withdrawal resistance than the polyiso board alone.

Table 1 below shows the results of impact testing of two insulated composite boards 500 and a polyiso board. A first insulated composite board 500 in the test included a 0.125-inch composite board 100 laminated to a 2.5-inch polyiso board (e.g., similar to the insulated composite board of FIG. 5), and a second insulated composite board 500 in the test included a 0.25-inch composite board 100 laminated to a 2.5-inch polyiso board (e.g., similar to the insulated composite board of FIG. 5). A 2.5-inch polyiso board was also tested as a control. Three samples of each of the polyiso board and the insulated composite boards 500 were placed on an impact load tester, and a 2-inch spherical steel ball weighing 535 grams was dropped from a height of 12 inches above the samples. The impact load tester measured the impact loads transferred through the sample to the load cell. Each of the three samples was tested, and an average maximum impact load was calculated. As shown in Table 1, when the sample of the polyiso board control sample was tested, the impact load tester measured a maximum load averaging 80.00 lbf. When the sample of the insulated composite board 500 with the 0.125-inch composite board 100 was tested, the impact load tester measured a maximum load averaging 108.59 lbf. When the sample of the insulated composite board 500 with the 0.25-inch composite board 100 was tested, the impact load tester measured a maximum load averaging 101.38 lbf. Thus, the control sample of the polyiso transferred about 21%-26% less force to the load cell compared to the insulated composite boards 500. This reduction in force is caused by the plastic deformation (e.g., crushing) of the polyiso board due to the impact, as observed during the test. In the insulated composite board 500, the stiffness of the composite board 100 causes the impact to be distributed over a larger area of the insulation layer 502, such that the insulation layer 502 does not experience any or substantially any plastic deformation. Crushing of the polyiso board due to impact is considered a localized failure of the polyiso foam with broader impacts on the stability of the board as a whole. Crushing the polyiso foam also results in a reduction in the insulating properties of the foam and can cause localized water pooling around depressions in the board where the foam has been crushed.

TABLE 1

| Sample Description | Max Load (lbf) |
| --- | --- |
| Control 1 2.5" 20 psi polyiso foam | 79.14 |
| Control 2 2.5" 20 psi polyiso foam | 76.06 |
| Control 3 2.5" 20 psi polyiso foam | 84.80 |
| Control Average | 80.00 |
| 1 CM Composite 0.125" + 2.5" 20 psi polyiso | 96.62 |
| 2 CM Composite 0.125" + 2.5" 20 psi polyiso | 134.59 |
| 3 CM Composite 0.125" + 2.5" 20 psi polyiso | 94.55 |
| CM Composite 0.125" + 2.5" 20 psi polyiso Average | 108.59 |
| 1 CM Composite 0.250" + 2.5" 20 psi polyiso | 95.45 |
| 2 CM Composite 0.250" + 2.5" 20 psi polyiso | 101.78 |

TABLE 1-continued

| Sample Description | Max Load (lbf) |
| --- | --- |
| 3 CM Composite 0.250" + 2.5" 20 psi polyiso | 106.91 |
| CM Composite 0.250" + 2.5" 20 psi polyiso Average | 101.38 |

Table 2 below shows the results of puncture testing of two insulated composite boards 500 and a polyiso board. Like the impact test discussed above with respect to Table 1, a first insulated composite board 500 in the test included a 0.125-inch composite board 100 laminated to a 2.5-inch polyiso board (e.g., similar to the insulated composite board of FIG. 5), and a second insulated composite board 500 in the test included a 0.25-inch composite board 100 laminated to a 2.5-inch polyiso board (e.g., similar to the insulated composite board of FIG. 5). A 2.5-inch polyiso board was also tested as a control. In each case, a 0.05-inch thick TPO roof membrane (e.g., similar to the roof membrane 18) was laminated to the polyiso board and the insulated composite boards 500 using solvent mastic adhesive with a dry film thickness of 0.5 millimeters. The load required to drive a rod into the board or insulated composite board 500 to a depth of 1.0 inch from the top surface at a rate of 0.10 inches per minute was measured. As shown in Table 2, when the polyiso board was tested, the load required to drive the rod into the board measured 138.06 lbf. When the sample of the insulated composite board 500 with the 0.125-inch composite board 100 was tested, the load required to drive the rod into the insulated composite board 500 measured 219.64 lbf. When the sample of the insulated composite board 500 with the 0.25-inch composite board 100 was tested, the load required to drive the rod into the insulated composite board 500 measured 267.65 lbf. Thus, the force required to drive the rod one inch into the insulated composite boards 500 with a 0.125-inch composite board and a 0.25-inch composite board was 40% to 96% greater than the force required to drive the rod one inch into the foam and membrane sample. Further during the test of the polyiso board, the roof membrane laminated to the board was punctured by the testing rod. In both insulated composite boards 500, the roof membrane was not punctured.

TABLE 2

| Sample | Sample Thickness (inches) | Max Load (lb) | Membrane Fail |
| --- | --- | --- | --- |
| PR-1-Iso | 2.08 | 138.06 | Yes |
| PR-2-0.125" | 2.22 | 219.64 | No |
| PR-3-0.25" | 2.30 | 267.65 | No |

Table 3 below shows the results of roof membrane adhesion testing of two composite boards 100 and a polyiso board. The first composite board 100 in the test was 0.125 inches thick, and the second composite board 100 in the test was 0.25 inches thick. A 2.5-inch thick polyiso board with a paper facer was also tested as a control. In each case, the middle 6 inches of a 24-inch by 2-inch strip of TPO roof membrane (e.g., similar to the roof membrane 18) was laminated to the polyiso board and the insulated composite boards 500 using an adhesive. The ends of the strip were both clamped by a universal test machine, and the load required to pull the strip away from the polyiso board or composite board 100 at a rate of 2.0 inches per minute was measured. As shown in Table 3, when the polyiso board was tested, the maximum load required to pull the strip of roof membrane away from the board measured 12.28 lbf. When the 0.125-inch composite board 100 was tested, the maximum load required to pull the strip of roof membrane away from the board 100 measured 49.53 lbf. When the 0.25-inch composite board 100 was tested, the maximum load required to pull the strip of roof membrane away from the board 100 measured 50.44 lbf. Thus, the force required to pull the strip of roof membrane away from the composite boards 100 was approximately 4 times that of the force required to pull the strip of roof membrane away from the polyiso board. Further, during the test of the polyiso board, the facer of the polyiso board was damaged by the adhesive when the strip of roof membrane was pulled away. In both of the composite boards 100, the facer (e.g., the top surface layer 102) was not damaged.

TABLE 3

| Sample | Max Load (lb) | Facer Fail |
|---|---|---|
| PR-1-Iso | 12.28 | Yes |
| PR-2-0.125" | 49.53 | No |
| PR-3-0.25" | 50.44 | No |

Table 4 below shows the results of fastener pullout testing of two insulated composite boards 500 and a polyiso board. Like the impact test discussed above with respect to Table 1, a first insulated composite board 500 in the test included a 0.125-inch composite board 100 laminated to a 2.5-inch polyiso board (e.g., similar to the insulated composite board of FIG. 5), and a second insulated composite board 500 in the test included a 0.25-inch composite board 100 laminated to a 2.5-inch polyiso board (e.g., similar to the insulated composite board of FIG. 5). A 2.5-inch polyiso board was also tested as a control. Two samples of the polyiso board and two samples of each insulated composite board were tested. In each case, a #14 roofing insulation screw was driven into the sample to a depth of approximately 0.75 inches. The screw was clamped by a universal test machine, and the force required to pull the screw out of the board or insulated composite board 500 at a rate of 2.0 inches per minute was measured. As shown in Table 3, when the polyiso board was tested, the maximum load required to pull the fastener out of the board measured 4.20-5.28 lbf. When the insulated composite board with the 0.125-inch composite board 100 was tested, the maximum load required to pull the fastener out of the insulated composite board 500 measured 28.19-56.02 lbf. When the insulated composite board 500 with the 0.25-inch composite board 100 was tested, the maximum load required to pull the fastener out of the insulated composite board 500 measured 87.81-85.05 lbf. Thus, the force required to pull the fastener out of the insulated composite boards 500 was approximately 5-20 times that of the force required to pull the fastener out of the polyiso board.

TABLE 4

| Sample | Description | Max Load (lb) |
|---|---|---|
| NP-1 | Polyiso foam | 4.20 |
| NP-2 | Polyiso foam | 5.28 |
| NP-3 | Polyiso 0.125 Composite board | 28.19 |
| NP-4 | Polyiso 0.125 Composite board | 56.02 |
| NP-5 | Polyiso 0.25 Composite board | 87.81 |
| NP-6 | Polyiso 0.25 Composite board | 85.05 |

The insulated composite boards 500 provide the additional benefit of easier installation, with the cost of installation being lower as a result. In typical flat roof installations, the insulation layer (e.g., insulation layer 14) is installed first, and then a cover board may be positioned on top of the insulation layer 14. A cover board (e.g., cover board 16) may then be installed on top of the insulation layer 14. A typical commercial flat roof may require thousands of insulation layer 14 boards and cover boards 16, which can take dozens of man-hours to install. By combining the insulation layer and cover board into a single insulated composite board 500, the insulation layer and cover board can be installed in a single operation. This can eliminate any time needed to install the cover boards 16 in a separate step. At $40 per hour per installer, the insulated composite board 500 may have an installation cost of about $0.042 lower per square foot of roof than the installation cost of separate insulation layer 14 boards and cover boards 16.

Figure 11:
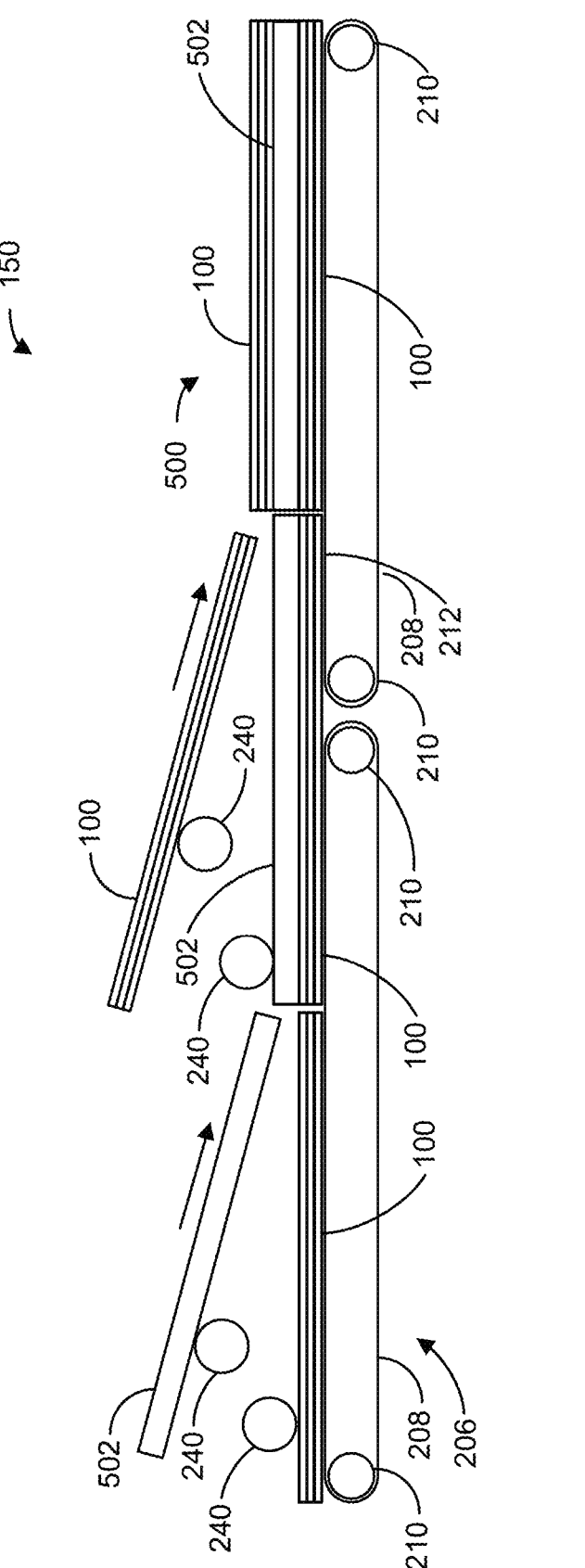
FIG. 11 is a side view illustration of a portion of an insulated composite board manufacturing system, in accordance with some embodiments of the present disclosure.

Referring now to FIG. 11, another portion of the insulated composite board manufacturing system 150 is shown in further detail, in accordance with some embodiments of the present disclosure. It should be understood that the various components of the insulated composite board manufacturing system 150 shown in FIG. 11 are not to scale. Further, certain components in the system, such as material handling equipment, are not shown. As discussed above, the insulated composite board manufacturing system 150 may include a conveyor system 206, which may continue to carry the composite boards 100 manufactured by the system 150 (e.g., as shown in FIG. 4). As shown in FIG. 11, the conveyor system 206 carries the composite boards 100 from left to right. The system 150 may further include automation devices for positioning insulation layers 502 onto the composite boards. The automation devices may be in the form of rollers, conveyors, cranes, robotic arms with vacuum lifters, or any other device capable of handling the insulation layers 502. The system 150 may further include adhesive applicators 240 configured to apply adhesive to the insulation layers 502 and/or the composite boards 100. The adhesive applicators 240 may be in the form of rollers, sprayers, brushes, or any other device capable of applying adhesive over the surface of the insulation layers 502 and/or the composite boards 100. After the adhesive is applied, the automation equipment may position the insulation layer 502 onto the composite board 100. The conveyor system 206 may then continue to carry the insulation layer 502 and the composite board 100 to a second location where a second composite board 100 may be coupled to the top of the insulation layer. Again, adhesive applicators 240 may apply adhesive to one or both of the upper surface of the insulation layer 502 or the lower surface of the second composite board 100. Automation equipment may then position the second composite board 100 on top of the insulation layer 502. The adhesive may then be allowed to dry and cure to form a complete insulated composite board 500 including two composite boards 100.

Figure 12:
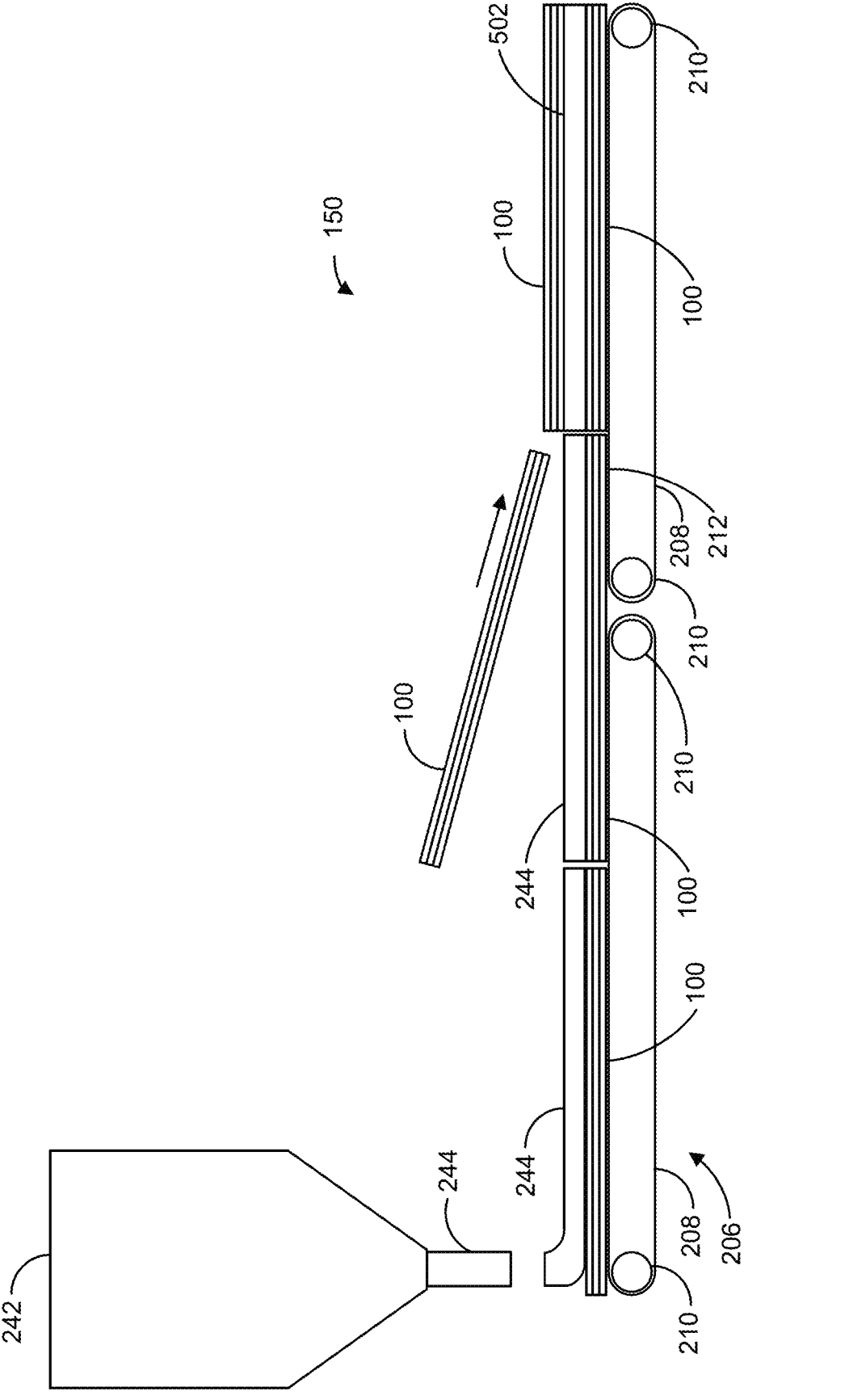
FIG. 12 is a side view illustration of a portion of an insulated composite board manufacturing system, in accordance with some embodiments of the present disclosure.

Referring now to FIG. 12, another portion of the insulated composite board manufacturing system 150 is shown in further detail, in accordance with some embodiments of the present disclosure. It should be understood that the various components of the insulated composite board manufacturing system 150 shown in FIG. 12 are not to scale. Further, certain components in the system, such as material handling equipment, are not shown. The portion of the insulated composite board manufacturing system 150 shown in FIG. 12 may be used in place of or in parallel with the portion of the insulated composite board manufacturing system 150 shown in FIG. 11 As discussed above, the insulated composite board manufacturing system 150 may include a conveyor system 206, which may continue to carry the composite boards 100 manufactured by the system 150 (e.g., as shown in FIG. 4). As shown in FIG. 12, the conveyor system 206 carries the composite boards 100 from left to right. The system 150 may include a liquid foam dispenser 242 configured to dispense liquid foam 244 (e.g., liquid polyiso foam) onto the composite boards 100 carried by the conveyor system 206. The conveyor system 206 may then carry the composite board and the liquid foam to a second location where a second composite board may be positioned on top of the liquid foam 244 The system 150 may further include automation devices for positioning a second composite board 100 on top of the liquid foam 244 before the liquid foam 244 cures. The automation devices may be in the form of rollers, conveyors, cranes, robotic arms with vacuum lifters, or any other device capable of handling the composite boards 100. After the second composite board 100 is positioned on the uncured liquid foam 244, the liquid foam 244 may be allowed to cure and bond to the composite boards to form a complete insulated composite board 500 including two composite boards 100. The composite board 100 and liquid foam 244 may be placed into a frame to constrain the liquid foam 244 to the footprint of the composite board 100 during the curing process.

Figure 13:
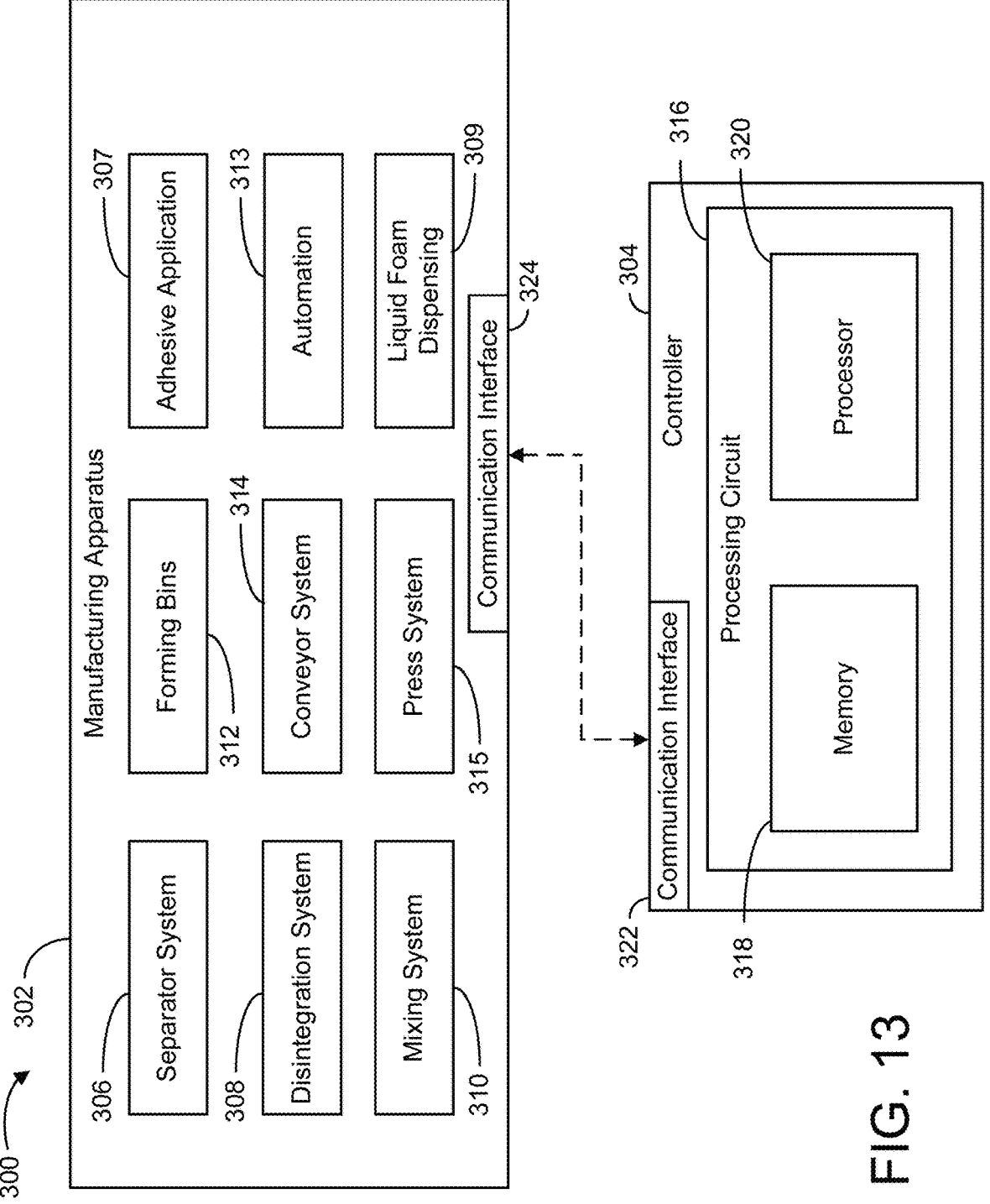
FIG. 13 is a block diagram of an insulated composite board manufacturing system, in accordance with some embodiments of the present disclosure.

Referring now to FIG. 13, a block diagram of an insulated composite board manufacturing system 300 is shown, in accordance with some embodiments of the present disclosure. The insulated composite board manufacturing system 300 may be similar or equivalent to the insulated composite board manufacturing system 150, shown and described with reference to FIGS. 2 and 3. The insulated composite board manufacturing system 300 may include a manufacturing apparatus 302 and a controller 304. Controller 304 may be a component of manufacturing apparatus 302 (e.g., a processor and/or display coupled to manufacturing apparatus 302) or may be external to manufacturing apparatus 302. Manufacturing apparatus 302 may include a separator system 306 (e.g., similar or equivalent to the sorting and separating assembly 154), an adhesive application system 307 (e.g., similar or equivalent to the adhesive applicators 240) a disintegration system 308 (e.g., similar or equivalent to the disintegration assemblies 160, 162, 166), a liquid foam dispensing system 309 (e.g., similar or equivalent to the liquid foam dispenser 242), a mixing system 310 (e.g., similar or equivalent to the mixing assembly 176), forming bins 312 (e.g., similar or equivalent to the forming bins 202), automation equipment 313 (e.g., similar or equivalent to the automation devices discussed above with respect to FIGS. 4, 12, and 13), a conveyor system 314 (e.g., similar or equivalent to the conveyor system 206), and a press system 315 (e.g., including presses similar to the hot press assembly 218 and the cold press assembly 224). Controller 304 may be configured to operate manufacturing apparatus 302 to manufacture insulated composite boards 500.

Controller 304 may include a processing circuit 316 and a communication interface 322. Processing circuit 316 may include a memory 318 and a processor 320, in some embodiments. Processing circuit 316 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. Processor 320 may include an ASIC, one or more FPGAs, a DSP, circuits containing one or more processing components, circuitry for supporting a microprocessor, a group of processing components, or other suitable electronic processing components. In some embodiments, processor 320 may execute computer code stored in memory 318 to facilitate the activities described herein. Memory 318 may be any volatile or non-volatile computer-readable storage medium capable of storing data or computer code relating to the activities. According to some embodiments, memory 318 may include computer code modules (e.g., executable code, object code, source code, script code, machine code, etc.) for execution by processor 320.

Communication interface 322 may communicate with a communication interface 324 of manufacturing apparatus 302 via any synchronous or asynchronous network. Communication interface 322 may include one or more communication interfaces that can communicate with the components of manufacturing apparatus 302. For example, controller 304 may control separator system 306, adhesive application system 307 disintegration system 308, liquid foam dispensing system 309, mixing system 310, forming bin 312, automation system 314, conveyor system 314, and/or press system 315 via communication interface 322.

For example, controller 304 may send instructions via communication interface 322 to the communication interface 324 of the manufacturing apparatus 302. The instructions may cause the separator system 306 to separate plastic elements 158 and cellulosic elements 156 from a mixed waste stream 152, and to separate the plastic elements 158 and cellulosic elements 156 from each other. The controller 304 may send instructions to the disintegration system 308 to disintegrate the cellulosic elements 156 and plastic elements 158. The instructions may include a target average fragment size for each set of elements 156, 158. In response to receiving the instructions, the shredders, mills, etc. of the disintegration system 308 may be adjusted to achieve the requested target average fragment size, for example, by using a screen with a different mesh size or increasing or decreasing the duration of milling. The controller 304 may send instructions (e.g., commands, signals, etc.) to the mixing system 310 indicating the ratio of fragments 168, 170 in the mixture. In response to receiving the instructions, actuators in the mixing system 310 may control how much of each type of fragment 168, 170 is added to the mixture 178 or mixtures 178. For example, the mixing system 310 may include storage tanks for the fragments 168, 170, and the instruction may cause a valve of each storage tank to open for a predetermined period of time to dispense the components of the mixture 178 in the desired ratio.

Based on sensor data and via communication interface 322, controller 304 may transmit signals to the manufacturing apparatus 302 or devices (e.g., actuators or controllers) that operate the individual components 312, 314, 315 to cause manufacturing apparatus 302 to form a mat 204 and a composite sandwich 216 and move the composite sandwich 216 on conveyor system 314 (e.g., by moving a conveyor belt of conveyor system 314) through the presses of press system 315. For example, the controller 304 may send instructions to the forming bin 312 indicating the amount of the mixture 178 to be deposited by the forming bin 312 or a desired thickness of the mixture 178 in the continuous mat 204. In response to receiving the instructions, actuators of the forming bin 312 may cause the mixture 178 to be dispensed at a rate corresponding to the amount instructed by the controller 304. The controller 304 may also send instructions to the conveyor system 314 and the press system 315 to control the speed of the continuous press assemblies 218, 224 and conveyor belts 208. In response to receiving the instructions, motors in conveyor system 314 and press system 315 may control the speed of the rollers 210, 222 that drive the belts 210, 220. The controller 304 may correlate the amount of the mixture 178 dispensed from the forming bins 312 to the speed of the belts 210, 220. If the system includes a stationary press, the controller 304 may be configured to control a hydraulic or other linear actuator to raise and lower an upper portion of the hot press to compress a composite sandwich 216. The controller 304 may also be configured to control a set of saws, including longitudinal rip saws and cross-cut saws, and one or more actuators of a cutting assembly to cut the composite sandwich 216 into finished composite boards 100.

The controller 304 may also send instructions to the conveyor system 314 causing the composite boards 100 to be moved to a portion of the manufacturing apparatus 302 in which insulation layers 502 may be bonded to the composite boards 100 (e.g., the portion of the system 150 shown in FIG. 11). The controller 304 may send instructions to the adhesive application system 307 and the automation system 313 causing the adhesive application system 307 to apply adhesive to one or both of a composite board 100 or an insulation layer 502 and the automation system 313 to place the insulation layer 502 on top of the composite board 100. For example, as shown in FIG. 11, the adhesive applicators 240 may spray, roll, or brush the adhesive onto one or both of a composite board 100 or an insulation layer 502, and a robotic arm, crane, or roller system may move the insulation layer 502 and place it on the composite board 100 as the composite board is moved by the conveyor system 206. The controller 304 may then send instructions causing the adhesive application system 307 and the automation system 313 to repeat a similar process, coupling a second composite board 100 to the opposite side of the insulation layer 502. The conveyor system 314 may then carry the composite boards 100 and insulation layer 502 to another location where the adhesive can cure and bond the insulation layer to the composite boards 100 to form an insulated composite board 500.

Alternatively, or in parallel, the controller 304 may also send instructions to the conveyor system 314 causing the composite boards 100 to be moved to a portion of the manufacturing apparatus 302 in which liquid foam 244 is applied to the composite boards 100 (e.g., the portion of the system 150 shown in FIG. 12). The controller 304 may send instructions to the liquid foam dispensing system 309 and the conveyor system 314 causing the liquid foam dispensing system 309 to apply liquid foam 244 to a composite board 100 as the conveyor system 314 moves the composite board 100. For example, as shown in FIG. 12, the conveyor system 206 may move the composite board 100 under the liquid foam dispenser 242. The controller 304 may send instructions causing the liquid foam dispenser to dispense the liquid foam 244 onto the composite board 100 as it passes under the dispenser 242. The controller 304 may control the rate at which the liquid foam 244 is dispensed such that a desired thickness of liquid foam 244 is applied. The controller 304 may also send instructions to the automation system 313 causing the automation system to place a second composite board 100 onto the layer of liquid foam 244. The conveyor system 314 may then carry the composite boards 100 and liquid foam 244 to another location where the liquid foam 244 can cure and bond to the composite boards 100 to form an insulated composite board 500.

Figure 14:
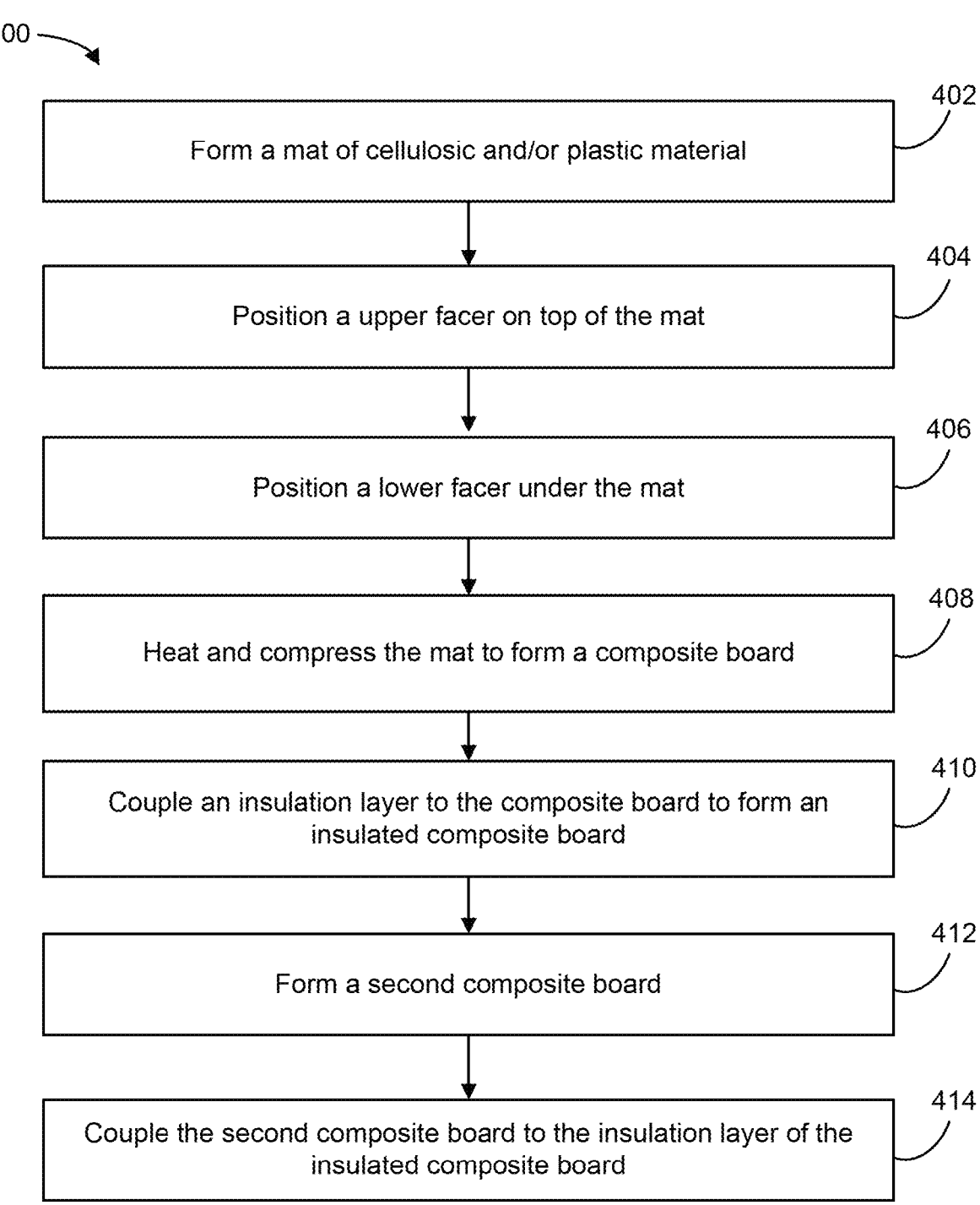
FIG. 14 is a flow diagram of an example process for forming an insulated composite board, in accordance with some embodiments of the present disclosure.

FIG. 14 is a diagram of an example process 400 for forming an insulated composite board 500, in accordance with some embodiments of the present disclosure. Process 400 can be performed using an insulated composite board manufacturing system (e.g., insulated composite board manufacturing system 150, insulated composite board manufacturing system 300). The system may include a controller (e.g., controller 304), milling and shredding devices, measuring devices, and mixing devices, as described with reference to FIG. 3, forming bins, conveyor systems, and hot and cold presses as described with reference to FIG. 4, and automation devices and adhesive applicators or liquid foam dispensers as described with reference to FIGS. 11 and 12. In some embodiments, one or more operations of process 400 may be performed by hand. Process 400 may include more or fewer operations, and the operations may be performed in any order. Performance of process 400 may enable the composite board manufacturing system to manufacture, from waste materials, an insulated composite board 500.

At operation 402 of the process 400, a mat of cellulosic and plastic (e.g., the continuous mat 204) is formed. The mat may include fragments of cellulosic and plastic materials generated in shredding or milling operations as discussed above. The plastic fragments may include thermoplastic fragments that can melt and solidify to bind the other fragments together. The material used to form the fragments may include new material or may be from a waste stream (e.g., a municipal waste stream, the waste stream 152, etc.). As discussed above, the mat may be deposited by a forming bin as a continuous mat onto a conveyor belt. At operation 404 of the process 400, an upper facer (e.g., upper facer 214) may be positioned on top of the mat, and at operation 406 of the process 400, a lower facer (e.g., lower facer 212) may be positioned below the mat. In some embodiments, an adhesive may be applied to the upper facer and/or the lower facer. In some embodiments, an adhesive may be applied to the outer surfaces of the mat. In some embodiments, the mat may include various layers including an upper outer layer and/or a lower outer layer including a binder, such as a thermoplastic binder. As shown in FIG. 4, positioning the facers above and below the mat may include inserting the facers under and on top of the mat on a conveyor system. In some embodiments, the process 400 may not include at least one of operation 404 or operation 406. For example, as discussed above, an upper facer and/or a lower facer may not be inserted above or below the mat, such that a finished composite board does not include a top surface layer 102 and/or a bottom surface layer 104.

At operation 408 of the process 400, the mat may be heated and compressed to form a composite board (e.g., composite board 100). The upper facer and/or the lower facer may be compressed along with the mat. The heat and compression applied during operation 408 may cause the upper facer and or the lower facer to adhere to the mat. For example, adhesive applied to the facers or the mat may cause the facers to adhere to the mat. In some embodiments, the material of the mat or outer layers of the mat may include materials, such as thermoplastic binders, that melt and resolidify, causing the facers to adhere to the mat. As discussed above, in some embodiments, only one facer or no facers may be pressed along with the mat, such that at least one outer face of the mat is exposed during heating and compression, and such that a core layer (e.g., core layer 106) of a finished composite board 100 remains exposed. The heating and compression in operation 408 may be performed using the hot press assembly 218 shown in FIG. 4. In some embodiments, the process 400 may also include cooling the mat after heating and compression, for example, using the cold press assembly 224.

At operation 410 of the process 400, an insulation layer may be coupled to the composite board to form an insulated composite board (e.g., the insulated composite board 500). In some embodiments, coupling the insulation layer to the composite board may include applying an adhesive to one or both of the insulation layer or the composite board. The insulation layer may be, for example, a polyiso board or other type of insulation board as discussed above. The adhesive may be, for example, a solvent mastic adhesive. The solvent mastic adhesive may have a dry film thickness of about 0.5 millimeters. Once the adhesive is applied to one or both of the insulation layer or the composite board, the insulation layer may be placed on top of or below the composite board with the adhesive between the insulation layer and the composite board. The adhesive may dry and cure over time such that the insulation layer becomes bonded to the composite board. In some embodiments, the insulation layer may be bonded to a bottom surface layer or a top surface layer of the composite board. For example, as shown in FIG. 5, the adhesive 506 bonds the insulation layer 502 to the bottom surface layer 104 of the composite board 100. In other embodiments, the adhesive may bond the insulation layer 502 to the top surface layer 102 or to the core layer 106, for example, when the composite board does not include one or both of the top surface layer 102 or the bottom surface layer 104. In some embodiments, an outer surface layer may be bonded to the opposite side of the insulation layer. For example, as shown in FIG. 5, the first side of the insulation layer is bonded to the bottom surface layer 104 and the other side of the insulation layer 502 is bonded to a bottom outer surface layer 504. In some embodiments, an outer surface layer of the insulation layer may be positioned between the insulation layer and the composite board. For example, a polyiso board may be manufactured to include an insulation layer position between two outer surface layers. The adhesive may be applied to one of the outer surface layers which may then be bonded to the composite board.

In some embodiments, coupling the insulation layer to the composite board may include applying liquid insulation material to the composite board. The liquid insulation material may be, for example, liquid polyiso foam. The liquid insulation material may have inherent adhesive properties and, as it dries and cures, may become bonded to the composite board without the need for additional adhesives. For example, as shown in FIG. 7, the insulation layer 502 may directly bond to the composite board 100 without any additional adhesive. In some embodiments, such as the embodiment of FIG. 7, the insulation material may be poured directly onto an exposed core layer of the composite board. For example, the composite board 100 of FIG. 7 may be positioned with the core layer 106 facing up in the top surface layer 102 facing down, and the liquid insulation material be applied on top of the core layer 106. In some embodiments, an outer surface layer (e.g., bottom outer surface layer 504) may be placed on top of the liquid insulation material after the liquid insulation material has been applied on top of the core layer 106 before the liquid insulation material cures. As the liquid insulation material cures, forming the insulation layer 502, the bottom outer surface layer 504 may bond to the insulation layer 502. The composite board and liquid foam may be placed into a frame to constrain the liquid foam to the footprint of the composite board during the curing process. In some embodiments, the insulated composite board may be trimmed to straighten the edges of the board or to create smaller boards.

In some embodiments, the process 400 may include operations 412 and 414. At operation 412 of the process 400, a second composite board may be formed according to operations 402-408. As discussed above, forming the composite board may include forming a mat of paper and plastic and heating and compressing the mat to form a core layer of a composite board. The composite board may also include a top surface layer and/or a bottom surface layer bonded to the core layer. At operation 414 of the process 400, the second composite board may be coupled to the insulation layer of the insulated composite board formed in operation 410. For example, in an embodiment in which an insulation board, such as a polyiso board, is coupled to the composite board in operation 410 using an adhesive, more adhesive may be applied to the opposite side of the insulation board, and the second composite board may be coupled to the opposite side of the insulation board. For example, as shown in FIG. 6, a first layer of adhesive 506 may couple a first side of the insulation layer 502 to a bottom surface layer 104 of a first composite board 100, and a second layer of adhesive 506 may couple the other side of the insulation layer 502 to a top surface layer 102 of a second composite board 100. The resulting insulated composite board 500 thus includes an insulation layer 502 sandwiched between two composite boards 100.

In embodiments in which liquid insulation material is used, the second composite board may be placed on top of the layer of liquid insulation material before the liquid insulation material cures. As the liquid insulation material cures and dries, the insulation layer bonds to both of the composite boards without the need for additional adhesive. For example, as shown in FIG. 8, the insulation layer 502 may be directly bonded to both of the composite boards 100. In operation 410, liquid insulation material may be applied on top of the core layer 106 of the lower composite board 100. Then, before the liquid insulation material cures, the upper composite board 100 may be placed on top of the liquid insulation material with the core layer 106 in direct contact with the liquid insulation material. As the liquid insulation material dries and cures, the insulation layer is formed and is directly coupled to the core layers 106 of each composite board 100. The resulting insulated composite board 500 thus includes an insulation layer 502 sandwiched between two composite boards 100. In various embodiments, the insulation layer may be coupled to the composite board or boards in various ways. For example, fasteners or adhesive strips may be used to couple the insulation layer to a composite board. In some embodiments, different methods may be used to couple the insulation layer to a first composite board and to a second composite board. For example, liquid insulation material may be applied to a first composite board and allowed to cure, and then a second composite board may be coupled to the cured insulation layer using adhesive.

In an aspect, an insulated composite board includes a first composite board including a first layer including a plurality of cellulosic fragments and a plurality of plastic fragments, and an insulation layer including a first face coupled to the first composite board, the insulation layer including a foam material.

In some embodiments, the insulated composite board includes an adhesive coupling the insulation layer to the first composite board.

In some embodiments, the adhesive is a solvent mastic adhesive.

In some embodiments, the insulated composite board includes a second composite board including a second layer including a plurality of cellulosic fragments and a plurality of plastic fragments, and the second composite board is coupled to a second face of the insulation layer.

In some embodiments, the foam material is polyisocyanurate.

In some embodiments, the foam material is directly coupled to the first composite board without the use of an additional adhesive.

In some embodiments, the foam material is directly coupled to the first layer of the first composite board.

In some embodiments, the insulated composite board includes a second composite board including a second layer including a plurality of cellulosic fragments and a plurality of plastic fragments, wherein the second layer is directly coupled to a second face of the insulation layer without the use of an additional adhesive.

In some embodiments, the first composite board includes a first facer coupled to a first side the first layer, wherein the insulation layer is coupled to the first facer.

In some embodiments, the first composite board includes a second facer coupled to a second side of the first layer.

In some embodiments, the composite board includes an outer surface layer defining an outer surface of the insulated composite board and coupled to the first layer by a reinforced bonding layer, the reinforced bonding layer including polypropylene with uninterrupted glass filaments or polyester filaments extending longitudinally through the polypropylene.

In some embodiments, the composite board includes an outer surface layer defining an outer surface of the insulated composite board, an adhesive layer coupled to the first layer of the composite board, and a fiberglass roving positioned between the adhesive layer and the outer surface layer.

In another aspect, a method of manufacturing an insulated composite board includes forming a first mat of cellulosic and plastic material, heating and compressing the first mat to form a first composite board and coupling an insulation layer to the first composite board.

In some embodiments, coupling the insulation layer to the first composite board includes pouring a liquid foam onto the first composite board and allowing the liquid foam to cure and bond to the first composite board.

In some embodiments, the method further includes forming a second mat of cellulosic and plastic material, heating and compressing the second mat to form a second composite board, and coupling the insulation layer to the second composite board such that the insulation layer is positioned between the first composite board and the second composite board.

In some embodiments, coupling the insulation layer to the second composite board includes positioning the second composite board on the liquid foam before the liquid foam cures and allowing the liquid foam to cure and bond to the second composite board.

In some embodiments, coupling the insulation layer to the first composite board includes applying an adhesive to at least one of the insulation layer or the first composite board.

In some embodiments, the method further includes positioning a facer adjacent the first mat, wherein heating and compressing the first mat includes heating and compressing the first mat and the facer, and wherein coupling the insulation layer to the first composite board includes coupling the insulation layer to the facer.

In some embodiments, the method further includes forming a second mat of cellulosic and plastic material, heating and compressing the second mat to form a second composite board, applying an adhesive to at least one of the insulation layer or the second composite board, and coupling the insulation layer to the second composite board using the adhesive.

In another aspect, a method of manufacturing an insulated composite board includes forming a first mat of cellulosic and plastic material, positioning a first facer adjacent the first mat, heating and compressing the first facer and the first mat to form a first composite board including a first core layer and a first facer layer, applying a liquid polyisocyanurate foam directly onto the first core layer, and allowing the liquid polyisocyanurate foam to cure and bond to the first core layer.

In some embodiments, applying the liquid polyisocyanurate foam includes positioning the first composite board with the first core layer facing up, and pouring the liquid polyisocyanurate foam onto the first core layer.

In some embodiments, the method further includes forming a second mat of cellulosic and plastic material positioning a second facer adjacent the second mat, heating and compressing the second facer and the second mat to form a second composite board including a second core layer and a second facer layer, positioning the second composite board on the liquid polyisocyanurate foam before the liquid polyisocyanurate foam cures, and allowing the liquid polyisocyanurate foam to cure and bond to the second core layer.

While this specification contains specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable sub-combination. Moreover, although features may be described as acting in certain combinations and even initially claimed as such, one or more features from a claimed combination can, in some cases, be excised from the combination, and the claimed combination may be directed to a sub-combination or variation of a sub-combination.

As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations,"

without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. An insulated composite board comprising:
a first composite board including a first layer comprising a plurality of cellulosic fragments and a plurality of plastic fragments; and
an insulation layer comprising a first face coupled to the first composite board, the insulation layer comprising a foam material.

2. The insulated composite board of claim 1, further comprising an adhesive coupling the insulation layer to the first composite board.

3. The insulated composite board of claim 2, wherein the adhesive is a solvent mastic adhesive.

4. The insulated composite board of claim 1, further comprising a second composite board including a second layer comprising a plurality of cellulosic fragments and a plurality of plastic fragments, wherein the second composite board is coupled to a second face of the insulation layer.

5. The insulated composite board of claim 1, wherein the foam material is polyisocyanurate.

6. The insulated composite board of claim 1, wherein the foam material is directly coupled to the first composite board without the use of an additional adhesive.

7. The insulated composite board of claim 6, wherein the foam material is directly coupled to the first layer of the first composite board.

8. The insulated composite board of claim 7, further comprising a second composite board including a second layer comprising a plurality of cellulosic fragments and a plurality of plastic fragments, wherein the second layer is directly coupled to a second face of the insulation layer without the use of an additional adhesive.

9. The insulated composite board of claim 1, wherein the first composite board comprises a first facer coupled to a first side the first layer, wherein the insulation layer is coupled to the first facer.

10. The insulated composite board of claim 9, wherein the first composite board comprises a second facer coupled to a second side of the first layer.

11. The insulated composite board of claim 1, wherein the composite board includes an outer surface layer defining an outer surface of the insulated composite board and coupled to the first layer by a reinforced bonding layer, the reinforced bonding layer comprising polypropylene with uninterrupted glass filaments or polyester filaments extending longitudinally through the polypropylene.

12. The insulated composite board of claim 1, wherein the composite board includes:

an outer surface layer defining an outer surface of the insulated composite board;

an adhesive layer coupled to the first layer of the composite board; and a fiberglass roving positioned between the adhesive layer and the outer surface layer.

\* \* \* \* \*